US010656989B1

(12) United States Patent
Havemose

(10) Patent No.: US 10,656,989 B1
(45) Date of Patent: *May 19, 2020

(54) SYSTEM AND METHOD FOR TREND ESTIMATION FOR APPLICATION-AGNOSTIC STATISTICAL FAULT DETECTION

(71) Applicant: OPEN INVENTION NETWORK LLC, Durham, NC (US)

(72) Inventor: Allan Havemose, Arroyo Grande, CA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,480

(22) Filed: Jul. 24, 2018

Related U.S. Application Data

(63) Continuation of application No. 14/951,153, filed on Nov. 24, 2015, now Pat. No. 10,031,796, which is a continuation-in-part of application No. 14/739,611, filed on Jun. 15, 2015, now Pat. No. 10,185,642, which is a continuation of application No. 14/089,234, filed on Nov. 25, 2013, now Pat. No. 9,092,331, which is a continuation of application No. 13/017,340, filed on Jan. 31, 2011, now Pat. No. 8,612,802.

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/076* (2013.01)

(58) Field of Classification Search
CPC ............... G06F 11/079; G06F 11/0709; G06F 11/0706; G06F 11/076; G06F 11/3065; G06F 11/3072; G06F 11/34; G06F 11/3409; G06F 11/3452
See application file for complete search history.

(56) References Cited

U.S. PATENT DOCUMENTS

| | | | | |
|---|---|---|---|---|
| 5,555,191 A | 9/1996 | Hripcsak | | |
| 5,740,233 A | 4/1998 | Cave et al. | | |
| 5,822,401 A | 10/1998 | Cave et al. | | |
| 6,865,591 B1 | 3/2005 | Garg et al. | | |
| 7,243,267 B2 | 7/2007 | Klemm et al. | | |
| 7,526,405 B2 * | 4/2009 | Miller | ................... | G05B 23/024 382/144 |
| 7,590,513 B2 * | 9/2009 | Jiang | ..................... | G06F 11/008 703/2 |

(Continued)

*Primary Examiner* — Joseph D Manoskey

(57) ABSTRACT

Trend estimation for application-agnostic statistical fault detection of multi-process applications in environments with data trend includes at least one of: a multi-process application runs on a host. Statistical events are collected and sent to a statistical fault detector. The statistical fault detector creates one or more distributions and compares recent statistical event data to historical statistical event data and uses deviation from historical norm for fault detection. Trend is estimated, and if needed, removed from event data prior to the creation of distributions. Trend is estimated using spectral techniques, filter banks and Maximum Entry Spectral Estimation, and dominant frequencies are estimated and utilized to adapt to the environment.

20 Claims, 15 Drawing Sheets

(56) References Cited

U.S. PATENT DOCUMENTS

| | | |
|---|---|---|
| 7,870,439 B2 | 1/2011 | Fujiyama et al. |
| 8,037,367 B1 | 10/2011 | Havemose |
| 8,122,280 B2 | 2/2012 | Ngan et al. |
| 8,281,184 B1 | 10/2012 | Havemose |
| 8,584,145 B1 | 11/2013 | Havemose |
| 8,589,953 B1 | 11/2013 | Havemose |
| 8,612,802 B1 | 12/2013 | Havemose |
| 9,628,499 B1 | 4/2017 | Yu et al. |
| 2005/0193229 A1 | 9/2005 | Garg et al. |
| 2005/0278703 A1 | 12/2005 | Lo et al. |
| 2006/0020866 A1 | 1/2006 | Lo et al. |
| 2006/0026467 A1 | 2/2006 | Nehab et al. |
| 2006/0063521 A1 | 3/2006 | Cheung et al. |
| 2006/0184340 A1 | 8/2006 | Fukuda et al. |
| 2007/0055914 A1 | 3/2007 | Chandwani et al. |
| 2008/0046477 A1 | 2/2008 | Schultz |
| 2008/0208527 A1* | 8/2008 | Kavaklioglu ........ C10G 11/187 702/179 |
| 2010/0037242 A1 | 2/2010 | Mannarswamy et al. |
| 2010/0082708 A1 | 4/2010 | Kim et al. |
| 2010/0100774 A1 | 4/2010 | Ding et al. |
| 2012/0151276 A1 | 6/2012 | Bjomer et al. |
| 2013/0031422 A1 | 1/2013 | Church et al. |

* cited by examiner

SYSTEM AND METHOD FOR TREND ESTIMATION FOR APPLICATION-AGNOSTIC STATISTICAL FAULT DETECTION

CROSS-REFERENCE TO RELATED APPLICATIONS

This application is a continuation of U.S. patent application Ser. No. 15/951,153, filed Nov. 24, 2015 titled SYSTEM AND METHOD FOR TREND ESTIMATION FOR APPLICATION-AGNOSTIC STATISTICAL FAULT DETECTION, issued as U.S. Pat. No. 10,031,796 on Jul. 24, 2018, which is a continuation in part of U.S. patent application Ser. No. 14/739,611, filed Jun. 15, 2015 titled SYSTEM AND METHOD FOR STATISTICAL APPLICATION-AGNOSTIC FAULT DETECTION, which is a continuation of U.S. patent application Ser. No. 14/089,234 filed Nov. 25, 2013 titled SYSTEM AND METHOD FOR STATISTICAL APPLICATION-AGNOSTIC FAULT DETECTION, issued U.S. Pat. No. 9,092,331, issued Jul. 28, 2015, which is a continuation of U.S. patent application Ser. No. 13/017,340 filed Jan. 31, 2011 titled SYSTEM AND METHOD FOR STATISTICAL APPLICATION-AGNOSTIC FAULT DETECTION, issued U.S. Pat. No. 8,612,802, issued Dec. 17, 2013, the disclosures of which are incorporated herein by reference in their entirety. This application is related to commonly assigned U.S. patent application Ser. No. 13/017,717 filed Jan. 31, 2011 titled SYSTEM AND METHOD FOR STATISTICAL APPLICATION-AGNOSTIC FAULT DETECTION, issued U.S. Pat. No. 8,656,226, issued Feb. 18, 2014 and U.S. patent application Ser. No. 12/334,651 filed on Dec. 15, 2008 titled METHOD AND SYSTEM FOR PROVIDING HIGH AVAILABILITY TO COMPUTER APPLICATIONS, issued U.S. Pat. No. 8,037,367, issued Oct. 11, 2011 the disclosures of which are incorporated herein by reference in their entirety.

BACKGROUND OF THE APPLICATION

1. Field of the Application

This application pertains to detection of run-time faults in applications running on computer systems, computer networks, telecommunications systems, embedded computer systems, wireless devices such as tablets, cell phones and PDAs, and more particularly to methods, systems and procedures (i.e., programming) for fault detection in environments with trend, where the core fault detection runs independently and transparently to the applications being fault detected and procedures for estimation of trend using a variety of statistical and signal processing techniques.

2. Description of Related Art

In many environments one of the most important features is to ensure that a running application remains operational and known to be operating without any faults. Specifically, if the application or something in the environment where the application executes somehow prevents accurate and fault-free operation, it is generally paramount to detect the application mal-function and initiate corrective action. By way of example: mission critical systems in telecommunications, military, financial and embedded applications must operate reliably and accurately and any fault may cause loss of customer data, customer connectivity or total loss of service. The autopilot on an airplane must continue to operate even if some of the software malfunctions, the 911 emergency phone system must continue to operate even if the main phone system if severely damaged, and stock exchanges deploy software that keep the exchange running even if some of the routers and servers go down. Today, the same expectations of "fault-free" operations are being placed on commodity computer systems and standard applications.

By way of example, and not limitation, consider the web portal for an eCommerce web site. Friday night the underlying storage array experiences a hard disk failure and the ability to keep up with the customer traffic is dramatically reduced. While the eCommerce application is functioning properly, the service it provides is impaired. Data requests start backing up as the impaired storage array cannot handle the traffic, and at some point, maybe several hours after the hard disk failure, the eCommerce application no longer can process and store customer records. So while the eCommerce application theoretically is operating properly, the actual run-time characteristics of the application is faulty as the eCommerce application ultimately loses customer records and stops processing purchasing requests.

A related issue is one of trend (also called drift) in the environment. In continuation of the example above if the eCommerce web site is successful; it may see ever-increasing utilization. The storage array may therefore exhibit slower and slower response times in view of the increased utilization. Degradation in response time may therefore both be an error condition, which should trigger fault detection, or a consequence of the increased load, which should not trigger a fault detection event.

Similarly to the scenario above where purchasing was impaired due to an impaired storage array, other online activities may experience the same type of faulty or impaired performance. Examples include, but are not limited to, logging into web sites, logging into social networks, using applications to explore the local community, finding friends online through searching, finding friends on Facebook, updating information on a web site or social network, etc. In general, any internet activity that requires interaction between multiple devices may experience one or more of the above-described scenarios and may benefit from the teachings in this application in order to detect and overcome fault scenarios.

The present application includes at least one of: accurately detecting such run-time malfunctions of applications, independently if whether the faulty operation is caused by the application itself or something in the environment wherein the application executes. This is accomplished by building a statistical description of the running application and by, at run-time, comparing the currently running application to the statistical model in order to detect abnormal conditions. The statistical model further incorporates the notion of trend and enables determination if an apparent abnormal condition actually may be attributed to trend as opposed to indicating a fault condition. The statistical model is built automatically without requiring any pre-defined knowledge of the application being monitored, and the statistical model automatically adapts to changes in environment. The finer details of the present application are disclosed in the following sections.

The prior art require extensive customization of the applications being fault-detected, limits the fault assumptions to a particular model or focuses the fault detection on a particular subsystem or class of fault-detectors. In each case, the fault detectors make very specific assumptions regarding the classes and types of faults being detected, require extensive customization, or are limited to certain subsystems. None of the cited prior art handle the types of soft fault where an application appears functional, but has degraded to the point of being non-functional, and none of the applications provide support for environments where the presence of trend may trigger an incorrect fault detection.

There is therefore a need for a fault detection service that runs fully transparent to the applications, runs on standard operating systems, and operates generically across subsystems and fault scenarios. The present application, in one embodiment, provides fault detection that is loaded dynamically along with the applications being monitored. The present application, in one embodiment, builds a dynamic statistical model of the running application without making any assumptions about underlying distributions or dynamic model, and makes statistical fault-detections by comparing run-time characteristics against the previously built statistical model. The present application, in one embodiment, works on standard operating systems, requires no custom kernels, system libraries, or custom applications.

BRIEF SUMMARY OF THE APPLICATION

The present application provides at least one of application-agnostic fault-detection that requires no modification to the applications being checkpointed (i.e. is transparent), works independently of which application is being monitored (i.e. is application agnostic), and works on commodity operating system and hardware.

The term "fault" is used to designate an abnormal condition or defect of a component, software, sub-system or equipment. Examples of faults include a power supply burning out, a CPU overheating, a software bug that crashes an application, or an environmental condition that makes an application not operate correctly. Faults can happen at any time and are thus non-deterministic, i.e. unpredictable. The term "Fault Detection" designates the mechanism used to detect that a fault has occurred. The present application discloses an application-agnostic statistically based approach to fault detection that covers a very broad range of application faults.

The following terms are also used throughout the disclosures:

The terms "Windows®" and "Microsoft Windows®" (WINDOWS) are utilized herein interchangeably to designate any and all versions of the Microsoft Windows operating systems. By example, and not limitation, this includes but is not limited to Windows XP, Windows Server 2003, Windows Server 2008, Windows Server 2012, Windows NT, Windows Vista, Windows 7, Windows 8, Windows 10, Windows Mobile, Windows RT, and Windows Embedded. The operation and design of Microsoft Windows is well documented on the web at msdn.microsoft.com.

The terms "Linux" and "UNIX" is utilized herein to designate any and all variants of Linux and UNIX. By example, and not limitation, this includes RedHat Linux, Suse Linux, Ubuntu Linux, Android, HPUX (HP UNIX), and Solaris (Sun UNIX). The design and operation of the Linux operating system is well documented both on the web and specifically at www.kernel.org.

The terms "iOS" and "MacOS" are utilized herein to designate any and all variants of Apple's iOS devices and Macintosh operating systems. By example, and not limitation, this includes operating systems for iPhones, iPads, iPods, and the Macintosh product lines.

The term "node", "host", "device", "computer", and "server" are utilized herein interchangeably to designate one or more processors running a single instance of an operating system. A virtual machine, such as a VMware, KVM, Virtual Box®, or XEN VM instance, is also considered a "node". Using VM technology, it is possible to have multiple nodes on one physical server.

The terms "application" or as appropriate "multi-process application" are utilized to designate a grouping of one or more processes, where each process can consist of one or more threads. Operating systems generally launch an application by creating the application's initial process and letting that initial process run/execute. In the following teachings we often identify the application at launch time with said initial process. Similarly, if an application is comprised of one process and only one thread within said one process, it is common to identify said thread and process.

As an application is a grouping of one or more processes, an application may thus be comprised of one or more other applications, each of which in turn is comprised of one of more processes. This hierarchy of application may continue to any depth without loss of generality.

In the following we use commonly known terms including but not limited to "client", "server", "API", "Java", "process", "process ID (PID)", "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", "sockets", "TCP/IP", "http", "ftp", "Inter-process communication (IPC), "Asynchronous Procedure Calls (APC), "POSIX", "certificate", "certificate authority", "Secure Socket Layer", "SSL", MD-5", "MD-6", "Message Digest", "SHA", "Secure Hash Algorithm", "NSA", "NIST", "private key", "public key", "key pair", and "hash collision", and "signal". These terms are well known in the art and thus will not be described in detail herein.

In the following we use commonly known terms and concepts from statistics, including but not limited to mean, average, standard deviation, deviation, standard error, variance, Normal distribution, Gaussian distribution, and statistical significance. These terms are well known in the art and will thus not be described further herein. Later in the disclosures broader definitions of some of terms are introduced.

The terms "drift" and "trend" are used interchangeably to designate that statistical properties change over time. By way of example, the mean of a distribution may change over time by showing seasonal variation, generally increasing or decreasing or showing other variability. Later in the disclosures specific measurements of trend are disclosed and incorporated into the teachings.

The term "transport" is utilized to designate the connection, mechanism and/or protocols used for communicating across the distributed application. Examples of transport include TCP/IP, UDP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which an application re-directs a system call or library call to a new implementation. On Linux and other UNIX variants interception may, by way of example, be achieved by a combination of LD_PRELOAD, wrapper functions, identically named functions resolved earlier in the load process, and changes to the kernel sys_call_table. On Windows, interception may be achieved, by way of example, by modifying a process' Import Address Table and creating Trampoline functions, as documented by "Detours: Binary Interception of Win32 Functions" by Galen Hunt and Doug Brubacher, Microsoft Research July 1999". Throughout the rest of this document the terminology interception to designate the functionality across all operating systems. The terminology pre-loading is used to designate the process of loading the interceptors into the application's address space on all operating systems.

The term "transparent" is used herein to designate that no modification to the application is required. In other words, the present application works directly on the application binary without needing any application customization, source code modifications, recompilation, re-linking, special installation, custom agents, or other extensions.

Modern operating systems such as Windows, MacOS, Android, iOS, and Linux separate the address space into kernel space and user space. Kernel space is the address space reserved for running the kernel, kernel extensions, and depending on operating system, device drivers. User space is the address space in which user processes (i.e. applications) run. Functionality may be added to the kernel using Loadable Kernel Module (LKM). Loadable kernel modules are also called Kernel Loadable Modules (KLM), kernel extensions, or simply Kernel Modules. Throughout the rest of this document we use the terms Loadable Kernel Module and kernel module interchangeably to designate the functionality across all operating systems.

To avoid simultaneous use of shared resources in multi-threaded multi-process applications locking is used. Several techniques and software constructs exists to arbitrate access to resources. Examples include, but are not limited to, mutexes, semaphores, futexes, critical sections and monitors. All serve similar purposes and often vary little from one implementation and operating system to another. In the following, the term "Lock" is used to designate any and all such locking mechanism. Properly written multi-process and multi-threaded application use locking to arbitrate access to shared resources The context of the present application is an application on a host, i.e. a server, PC, laptop, cell phone, PDA, tablet, or other computing device. An application may be single-process or multi-process, and may contain one or more threads.

As part of loading an application interceptors are loaded. The interceptors collect statistical events and sends said events to a statistical fault detector (SFD). Statistical events, also called events or event samples, may be used to collect relevant statistical data about how an application executes. Interception is transparent and work automatically in the background.

Another aspect of the present application is that events may be grouped into Event Groups. The grouping of events serves to associated similar or related events into larger groups, and to facility consensus fault detection and elimination of duplicate fault-detections for cascading faults.

Another key aspect is that the processing of events within the statistical fault detector is done outside the application being fault detected.

A key aspect of the present application is that faults in the environment that cause impaired performance of the application may be detected as well.

Another aspect is that the SFD builds historical distributions based on the statistical events, and may generate multiple distributions based on one event. Example distributions include raw event distributions, temporal event distributions, and spatial event distributions.

Yet another aspect is transformation of statistical events. Each event may be transformed any number of times, and multiple new events or event groups generated from said transformed events.

Fault detection is achieved by comparing recent statistical events to the historical distributions and by detecting statistically significant deviation from the historical norms. Several different approaches to statistical significance are taught including using Gaussian distributions and custom confidence interval calculations which are disclosed.

Another aspect is that temporal distributions use a temporal filter such as time-of-day, day-of-week, and spatial distribution use a spatial filter such as node-name or transport.

Yet another aspect of the present application is that the event hierarchy is traversed from the events to the all-inclusive event group providing consensus fault detection and elimination of duplicate fault-detections for cascading faults.

Another aspect of the present application is that the teachings apply to cloud computing deployments, distributed deployments, individual servers and desktops, as well as classic data center deployments.

Another aspect of the present application is the distributions may be built based on de-trended event data, where de-trending essentially removes trend.

Yet another aspect is that distributions based on de-trended data may help eliminate false fault-detections, where the fault detection based on the original non-de-trended data incorrectly would trigger fault detection.

A related aspect is teachings of several ways to detect and determine trend. De-trending is taught using one or more of differencing, moving averages, least squares, and general trend estimation. Additional tend-estimation techniques include digital filters, Maximum Entropy Spectral Estimation, general spectral techniques, and signal processing techniques.

A further aspect of the present application is that it can be provided on commodity operating systems such as Linux and Windows, and on commodity hardware such as Intel, AMD, SPARC and MIPS. The present application thus works on commodity operating systems, commodity hardware with standard (off the shelf) software without needing any further modifications.

Further aspects of the application will be brought out in the following portions of the specification, wherein the detailed description is for the purpose of fully disclosing preferred embodiments of the application without placing limitations thereon.

BRIEF DESCRIPTION OF THE DRAWINGS

The application will be more fully understood by reference to the following drawings which are for illustrative purposes only.

DETAILED DESCRIPTION OF THE APPLICATION

Referring more specifically to the drawings, for illustrative purposes the present application will be disclosed in relation to FIG. 1 through FIG. 15 It will be appreciated that the system and apparatus of the application may vary as to configuration and as to details of the constituent components, and that the method may vary as to the specific steps and sequence, without departing from the basic concepts as disclosed herein.

0. INTRODUCTION

The context in which this application is disclosed is an application running on a server or other computing device. Without affecting the general case of multiple applications, the following disclosures often depict and describe just one application. Multiple applications are handled in a similar manner.

Likewise, the disclosures generally describe applications with one or two processes; any number of processes is handled in a similar manner. Finally, the disclosures generally describe one or two threads per process; any number of threads is handled in a similar manner

1. OVERVIEW

Figure 1:
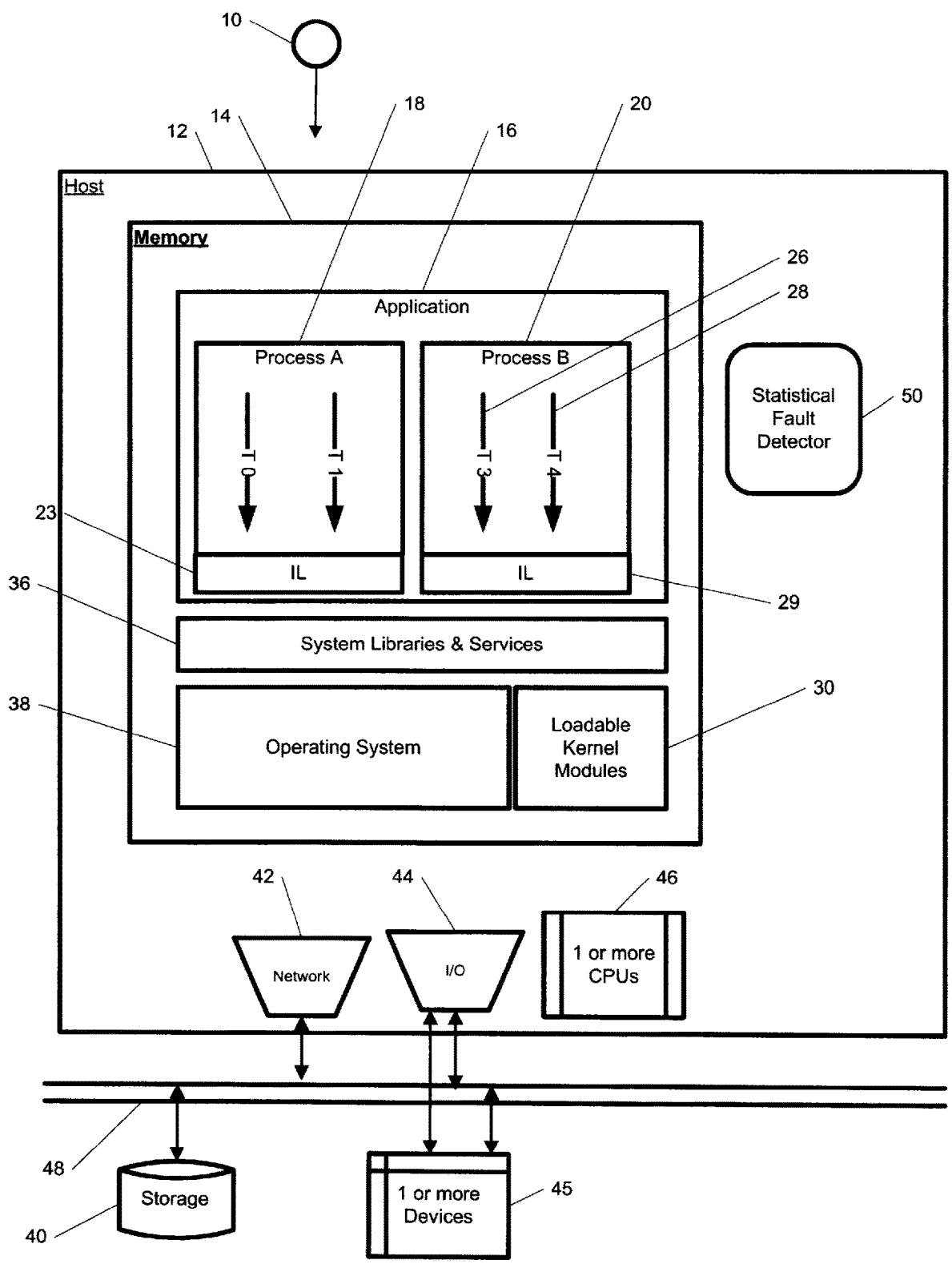
FIG. 1 is a block diagram of the core system architecture.

FIG. 1 illustrates by way of example embodiment 10 the overall structure of the present application. The following brief overview illustrates the high-level relationship between the various components; further details on the inner workings and interdependencies are provided in the following sections. FIG. 1 Illustrates by way of example embodiment 10 a host 12 with an application 16 loaded into system memory 14. The application 16 is comprised of two processes; process A 18 and process B 20. Each of the two processes has two running threads. Process A contains thread T0 22 and thread T1 24, while process B contains thread T3 26 and thread T4 28. As part of loading the application 16 an interception layer (IL) 23, 29 is pre-loaded into the address space of each process. Interception Layer 23 for process A is preloaded into process A's address space and Interception Layer 29 is preloaded into process B's address space. The system libraries and system services 36 are generally interposed between the application 16 and operating system 38. Alongside with the operating system 38 are the loadable kernel modules 30.

The interceptors communicate with a Statistical Fault Detector (SFD) 50, which is the module responsible for building the statistical model of the application and for issuing fault detection events.

System resources, such as CPUs 46, I/O devices 44, Network interfaces 42 and storage 40 are accessed using the operating system 38 and the loadable kernel modules 30. Devices accessing remote resources use some form of transport network 48. By way of example, system networking 42 may use TCP/IP over Ethernet transport, Storage 40 may use Fibre Channel or Ethernet transport, and I/O 44 may use USB.

One or more external devices 45 may be connected to the host 12 either via the network 48 or a connection though I/O 44, or through other interfaces.

FIG. 1 illustrates the system libraries 36 as separate from the application 16 and the individual processes process A 18 and process B 20. The system libraries are generally shared libraries. For clarity of presentation, the system libraries are depicted outside the address space of the individual processes, even though some library state and code is present within the address space of the individual application processes.

In an alternate embodiment the functionality of the kernel module 30 is built into, i.e. compiled into, the kernel. This eliminates the need to load the kernel module, at the expense of being custom kernel. The preferred embodiment disclosed herein provides services as kernel modules, but it is obvious to anyone with ordinary skills in the art the kernel module functionality could be compiled into the kernel as disclosed for the alternate embodiment.

FIG. 1 illustrates the application with an Interception Layer IL 23, 29 for each process. In a preferred embodiment using interception, the interception Layer is present. In a preferred embodiment not using interception, the interception Layer is absent, or configured to not perform any interceptions.

Figure 2:
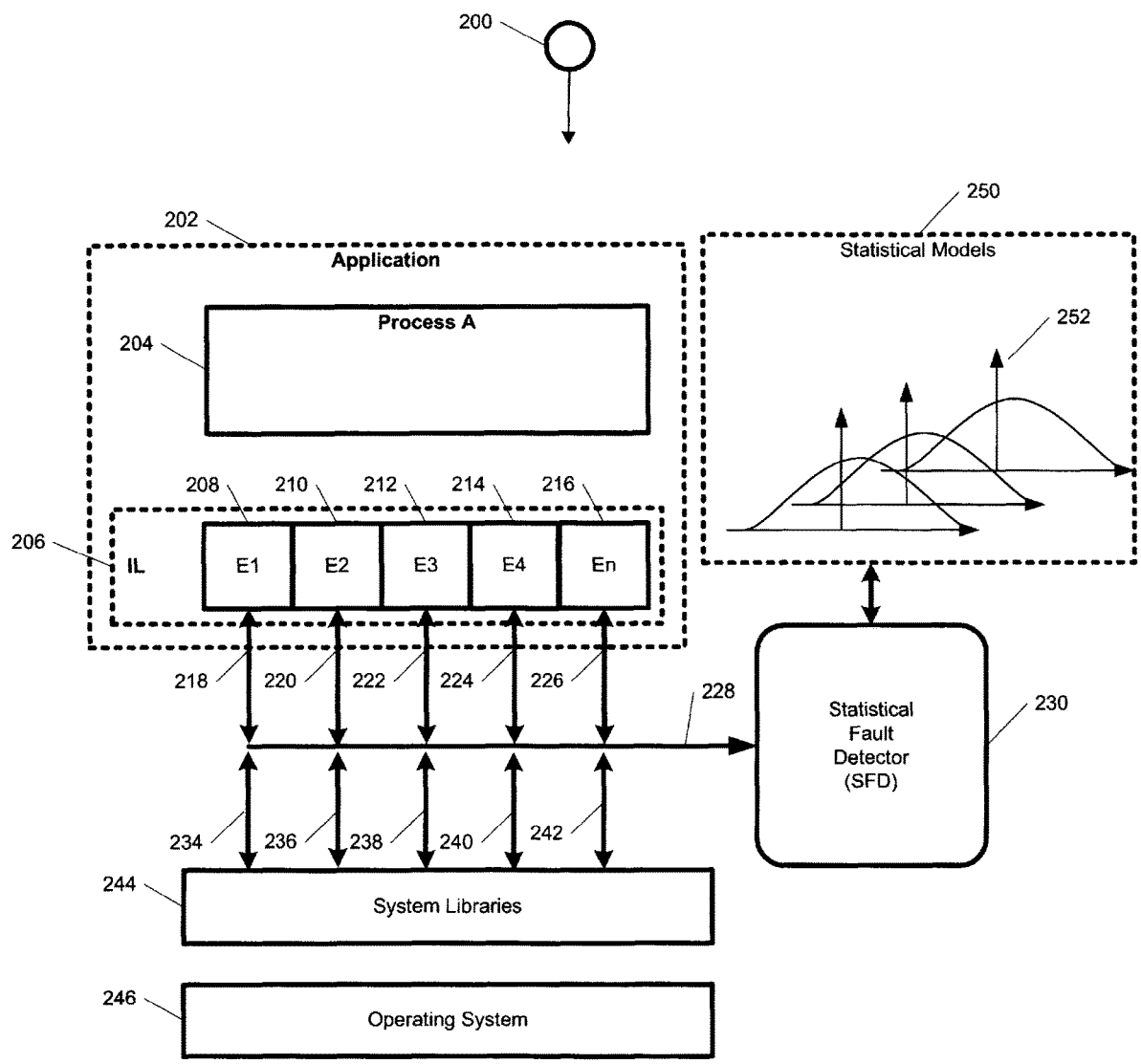
FIG. 2 is a block diagram illustrating high-level interception flow.

FIG. 2 illustrates by way of example embodiment 200 the high-level interception flow. By way of example, and not limitation, an application 202 is comprised of one process 204; multiple processes are handled in a similar manner. The interception layer (IL) 206 intercepts calls to the system libraries and operating system. To better illustrate the operation, FIG. 2 illustrates an IL 206 with 'n' interceptors E1 208 through En 216.

Interceptors are furthermore divided into Event Groups (EGs). Example groupings include, but are not limited to: I/O, networking, memory, processes, threads, and security. The primary purpose of the event groups is to group (or associate) related functionality and more conveniently express statistical relationships and properties among interceptors within a group. By way of example, it is more likely that two interceptors related to file operations have correlated behavior, than one interceptor for a file operation and one interceptor for thread management. However, the grouping is arbitrary, and as disclosed above, only serve to more conveniently express statistical relationships between similar, and thus likely related, interceptors. The association of events with specific event groups is provided within the Statistical Fault Detector, and further disclosed below.

Referring again to FIG. 2 for example embodiment 200, E1 208 intercepts a function, collects statistical data 218, delivers said data 228 to the Statistical fault detector 230, and calls the real library call 234. Upon completing the library call 234 further statistical data is collected and sent 228 to the SFD 230, and the call returns 218. Likewise for E2 210, E3 212, E4 214 and En 216, data is collected 220, 222, 224 and 226 respectively and delivered 228 to the SFD 230, the calls finished 236, 238, 240 and 242, more statistical data sent 228 and the calls returned 220, 222, 224 and 226 respectively.

In the example embodiment 200 and associated disclosures the intercepted calls terminate 234, 236, 238, 240 and 242 in the system library. Identical teachings apply if the calls terminated in a non-system library, the kernel or other library.

The Statistical Fault Detector (SFD) 230 builds a statistical model 250, 252 for every intercepted call 206. Said statistical models adapt as newly intercepted data is added and older data is discarded. The SFD is disclosed in further detail below.

2. INTERCEPTION

Figure 3:
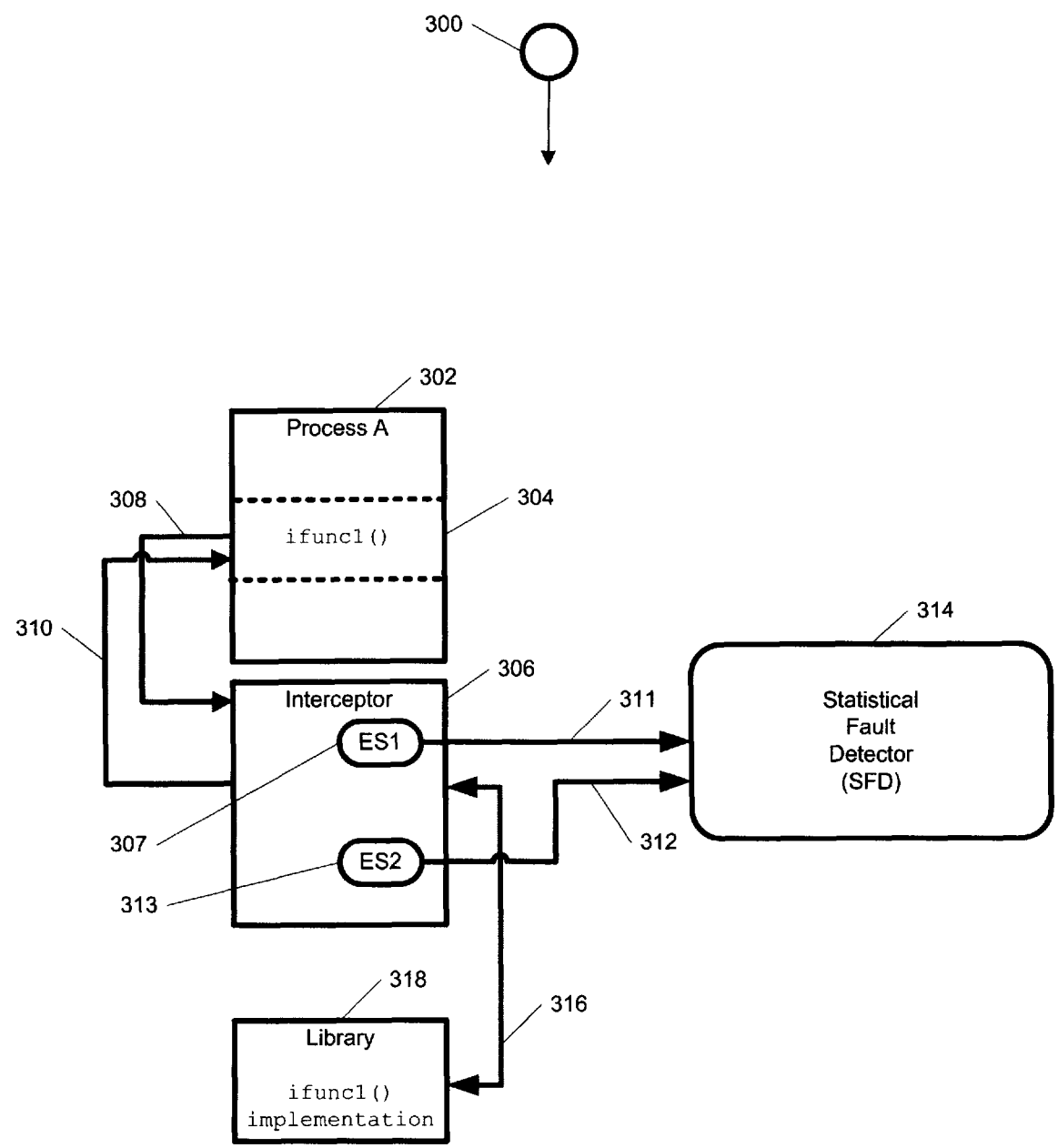
FIG. 3 is a block diagram illustrating interception in more details and interaction with the SFD.

FIG. 3 illustrates by way of example embodiment 300, the core interception architecture for an application with one process, process A 302, and with interceptor 306. By way of example, ifunc1( ) is subject to interception. When process A reaches 304 ifunc1( ) it is intercepted 308 and the call redirected to the interceptor 306. The interceptor collects relevant statistical information about ifunc1( ). In the following said statistical information is called an event sample (ES) or simply an event. Event samples are further defined below.

First an event sample ES1 307 is created. At this time the implementation 318 of ifunc1( ) has not been called, and ES1 therefore contain information about the intended behavior of ifunc1( ). By way of example, if ifunc1( ) is a call to write data, ES1 307 may contain the number of bytes to be written, the name of the file, and the file attributes. The initial Event Sample ES1 307 is sent 311 to the Statistical Fault Detector (SFD) 314.

The interceptor then calls the implementation for ifunc1( ) 316, 318. Upon returning from the library implementation 316 the return value and a second Event Sample ES2 313 is created. ES2 313 contains the results of calling the implementation of ifunc1( ), including any error values, and optionally contains information such as the time it took to complete the implementation of ifunc1( ) 318. ES2 313 thus contain event sample information representing the actual behavior of ifunc1( ). ES2 313 is then sent 312 to the SFD 314.

The interceptor then returns 310 to ifunc1( ) 304 in process A 302. Upon returning to the caller 310 Process A resumes execution and process A is unaware that the call to ifunc1( ) was intercepted and one or more statistical events generated.

In an alternate embodiment, only one event sample is generated for each interception. ES1 307 is collected but never transmitted, and later combined into ES2 313, which is transmitted 312 to the SFD 314. Combining ES1 and ES2 produces fewer transmitted messages to the SFD 314, but loses the ability to easily separate intended behavior from actual behavior. In yet another embodiment ES2 is used to baseline all statistical events, and there is no distinction between intended behavior and actual behavior.

In a preferred embodiment the interception layer is implemented as a shared library and pre-loaded into each application process' address space as part of loading the application. Shared libraries are generally implemented in such a way that each instance of the interception layer share the same code, but have their own private data. In a multi-process application the interception layer is therefore comprised of one interception layer per application process, and together the process-level interception layers comprise the interception layer for the entire application.

A related issue with interception is that intercepted functions may call other intercepted functions. As long as said calls are performed using public intercepted names, the previous teachings fully describe the interception. At times shared-library developers take shortcuts and don't use the public names, but refer directly to the implementation using a private name. In such cases, the interceptor may overlay a copy of the intercepted shared library code using fully resolved public function names.

3. STATISTICAL FAULT DETECTOR (SFD)

The SFD receives all the individual event samples, and uses the event samples to create a statistical model for each event type and possibly one or more event groups. The SFD creates models for both individual events and event groups, as event groups may be used to find faults across a subsystem before the individual events are showing faults with statistical significance.

3.1 Event Samples (ES).

By way of example, we examine the event samples for two functions from the standard I/O library, often referred to as stdio.h (http://en.wikipedia.org/wiki/Stdio.h):

1. FILE *fopen(const char *path, const char *mode);
2. size_t fwrite (const void *array, size_t size, size_t count, FILE *stream);

Referring to the signatures of the two methods, fopen opens a file with filename and path "*path" and mode field as indicated in "*mode". The result of fopen( ) is returned as NULL if fopen( ) failed, or a pointer to the FILE if fopen( ) succeeded. Similarly, fwrite( ) writes "count" data blocks of size "size" contained in "*array" to the file indicated by "*stream". The operation and definitions of in stdio.h are well known to anyone skilled in the art, and will thus only be explained to the extent necessary to fully teach the present application.

Event Samples for fopen( ) captures data relevant to building a statistical model for the operation of fopen( ). Said data include, but may not be limited to: time stamp, file name (*path), mode (*mode), and state of file pointer (*FILE).

Event Samples for fwrite( ) captures data relevant to building a statistical model for the operation of fwrite( ). Said data include, but may not be limited to: time stamp, file pointer (*stream), data (*array), size of data blocks (size), and number of blocks (count).

Each event is assigned an event type, corresponding to the type of function being intercepted. By way of example fopen( ), fwrite( ) and fread( ) would be assigned separate and distinct event types. A time stamp (TS) is included in all Event Samples and designates the time at which the event was created.

The Event thus consists of data with the following structure:

EventType, TimeStamp, <Event Specific Data>

In a preferred embodiment EventType is encoded as an integer, while in an alternate embodiment the EventType is encoded as a string or XML. The creation of the statistical model for Events is disclosed below.

3.2 Event Groups

Event groups, as disclosed above, are groupings of related interceptors. By way of example, functions in stdio.h may be grouped into one event group. The benefits of grouping may be illustrated by way of example: A fault causing e.g. fwrite( ) to fail for a particular file, will likely also cause following fread( ), getchar( ), fputs( ) and other stdio.h functions to fail for the same file. One fault may thus cause a cascade of related fault and while one fault in e.g. fwrite( ) may be difficult to detect, the cascade of many faults in the Event Group may reach statistical significance sooner than the individual events.

Event Groups are thus an effective way to detect faults in cases where a larger number of separate faults together reach statistical significance. The creation of a statistical model for event groups is disclosed below.

In a preferred embodiment events are assigned at least one event group corresponding to the library or module wherein the interceptor is implemented. An event may be a member of more than one event group as is disclosed below.

3.3 Processing Events

Figure 4:
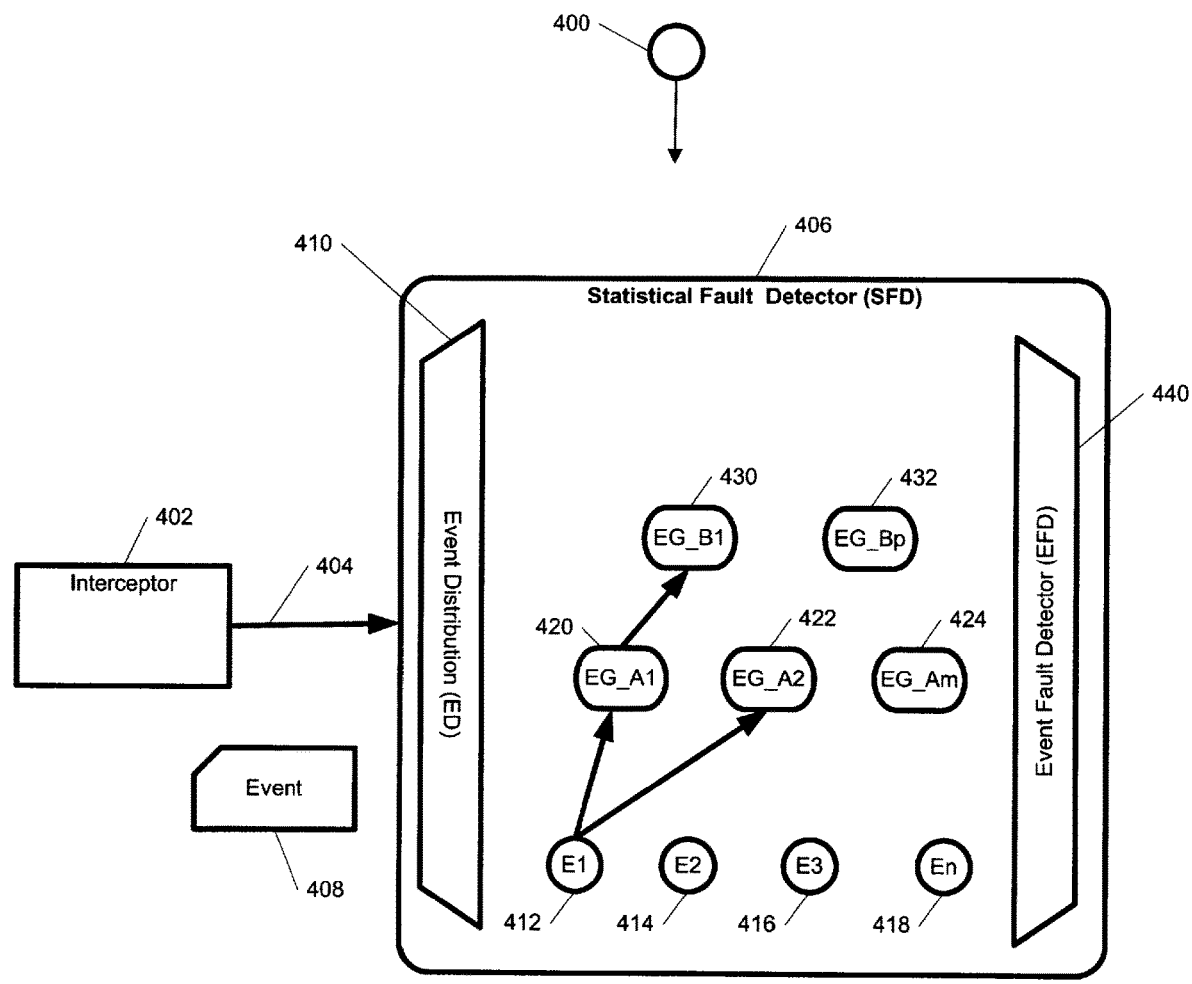
FIG. 4 is a block diagram illustrating processing within the SFD.

FIG. 4 illustrates by way of example embodiment 400, the initial stages of event processing within the SFD 406. As previously disclosed, events 408 are generated within the interceptors 402 and sent 404 to the SFD. Upon arriving at the SFD, the incoming events are processed by the Event Distribution (ED) 410 module.

As previously disclosed, each event may belong to one or more event groups, and disclosed in section 4.5 below, is organized into a hierarchy of events and event groups. Said event groups and event group hierarchy is maintained within the SFD, and is thus available to the ED facility. By way of example 'n' distinct events are supported: event E1 412, E2 414, E3 416 and En 418. Event groups EG_A1 420, EG_A2 422, EG_Am 424, EG_B1 430, and EG_Bp 432 are example event groups. E1 412 is a member of EG_A1 420 and by association in Event Group EG_B1 430. The event group hierarchy is further disclosed below.

Processing of Event E1 412 proceeds as follows: The event group hierarchy for Event E1 412 is identified, and the event E1 412 is passed to EG_A1 420 and EG_B1 430. The single event E1 is thus processed by the core event E1 and all event groups in which E1 is a member. The Event Fault Detector (ETD) infrastructure 440 for said events and event groups are further disclosed below.

Said processing of events is now further disclosed.

4.0 STATISTICAL MODEL OF EVENTS

The statistical models for Events in the present application address the following factors:
1. Raw Event distribution without time factor
2. Temporal Event Distribution where by way of example time of day, day of week, or day of month are factored into the distribution.
3. Spatial Event Distributions where distributions are aggregated across multiple systems and networks, including systems that are co-located or located at multiple geographic locations.
4. Transformation of events to facility processing and creation of distributions or creation of additional events.

All of said factors may influence fault detection, and may be in use to both accurately detect a system fault or to accurately eliminate a system fault. By way of example, consider a large enterprise email system, where every Monday at 8:00 the email system gets unusually busy based on everyone coming back to work after the weekend. While the unusual traffic profile may indicate a problem, and the likely slower response times may indicate a problem, the temporal distribution will likely show that Monday's around 8 AM have unusually heavy traffic. The interplay of the temporal weekly distribution with the raw traffic distribution thus provide a mechanism to avoid falsely designate the Monday 8 AM slow response times as a fault condition.

4.1 Raw Event Distribution (RED) and DV:

The Raw Event Distribution (RED) is comprised of a specific amount of recent events. By way of example, the raw event distribution may consist of the most recent 100,000 events without consideration as to when the events took place. As a new event arrives, the oldest one is removed. The specific number of events may be pre-defined or may be dynamically determined using, by way of example, frequency of data, dynamic data range, minimum number of events for statistical significance, or other measurement.

Figure 5:
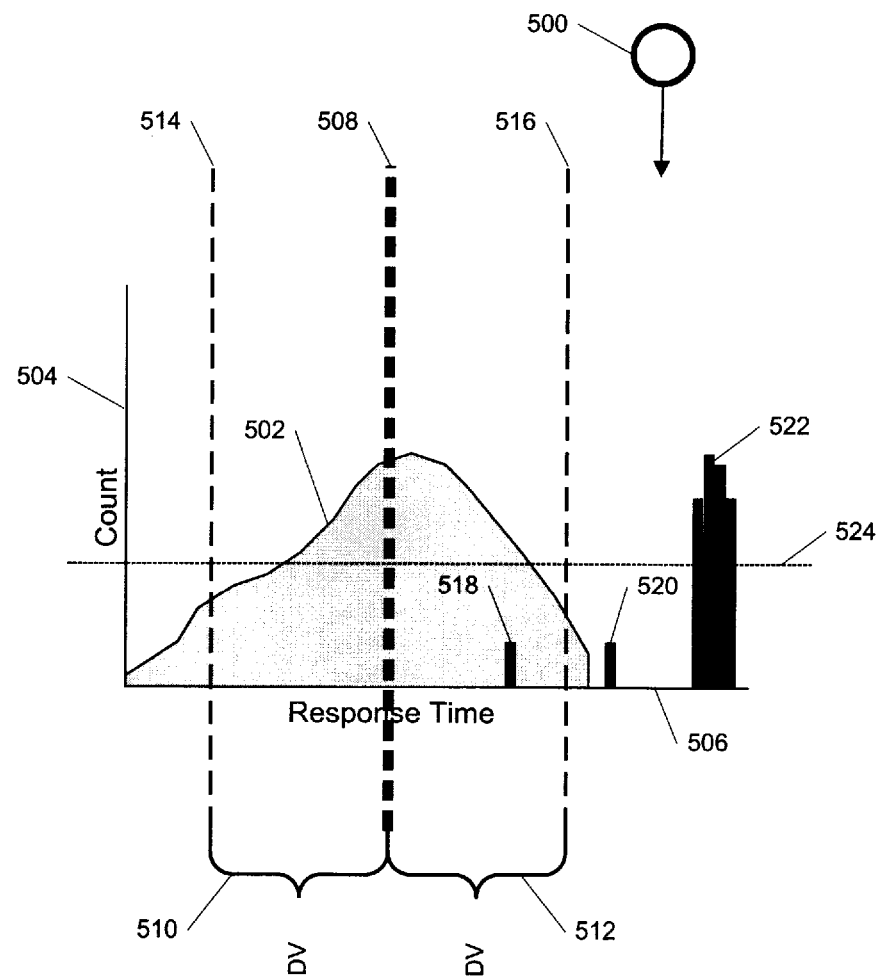
FIG. 5 is a block diagram illustrating a raw event distribution.

FIG. 5 illustrates by way of example embodiment 500 a raw event distribution 502 for a specific event type. The event type is "response time" for an event and the distribution is a distribution of response time 506 versus the number of times ("Count") 504 the specific response time occurred. As part of the distribution the mean 508 is calculated. Additionally, a measure of "Distribution-Variability" ("DV") is calculated 510, 512. Examples of said "distribution-variability" are standard deviation and standard error, but other custom error measures may also be used. A custom distribution-agnostic DV is given below. The calculation of mean, standard deviation and standard error are well known in the art and will thus not be further disclosed herein.

Generally, standard deviation and standard error are used in the context of the Normal, also called Gaussian, distribution. However, without knowledge about the distribution, many of the "well-known" facts about the standard deviation and its properties may no longer be assumed true. A simpler distribution-agnostic DV may be calculated as follows: sort all events in the distribution and remove the top x % and the bottom x %. The remaining interval may be interpreted as 2*DV, and the mean be set to the median value of the distribution. This approach ensures distribution-agnostic values of mean and DV and provides specific measurement of the distribution and its variability. By way of example, the DV may be calculated by removing the top 5% and the bottom 5% of all events.

The interval from the mean minus DV 514 to the mean plus DV 516 thus contains the majority of all events and may be used to determine if an event is a normal event or an abnormal event. By way of example, if an event 518 is contained within the interval [mean−DV;mean+DV] it may be assumed that this is a normal event and that everything is working according to historical norms. If an event arrives outside 520 [mean-DV;mean+DV] it may be assumed that this is an abnormal event and that something may be working improperly. If the event outside the interval only occurs a few times and then disappears 520 it was likely a spurious issue that may be ignored. If however, there are multiple events clustered over a range 522, it may be assumed that something has gone wrong and that corrective action is required. To determine if multiple events occur in sufficient numbers to merit corrective action, the number of clustered events outside the [mean−DV;mean+DV] interval may be compared to the average number of events for events with the [mean−DV,mean+DV] interval 524. Other measurements to determine sufficient number of events may be average number of events plus a fraction of standard deviation, or other custom statistical measure.

The above teachings thus provide a distribution-agnostic mechanism to determine if events are within the historical characteristics of an event distribution or if the events fall sufficiently outside the historical characteristics to trigger fault detection. In the context of fault detection, the most recent events are compared to the reference distribution.

The teachings use the terminology "statistical significance" to designate that a sufficient number of, generally recent, events have taken place within or outside the DV interval. The interval from mean minus DV to mean plus DV may also be interpreted as the "confidence interval" for the event distribution. These are broader definitions than typically found in statistics, where statistical significance and confidence intervals often are expressed in the context of a particular distribution.

4.2 Temporal Event Distribution (TED)

The Temporal Event Distribution (TED) is built on the Raw Event Distribution (RED) with one significant addition. TEDs are a subset of the REDs, and only contain events that meet specific temporal filter. Example temporal filters are: Time of Day, Day of Week with Time of day, and day of month with time of day.

Figure 6:
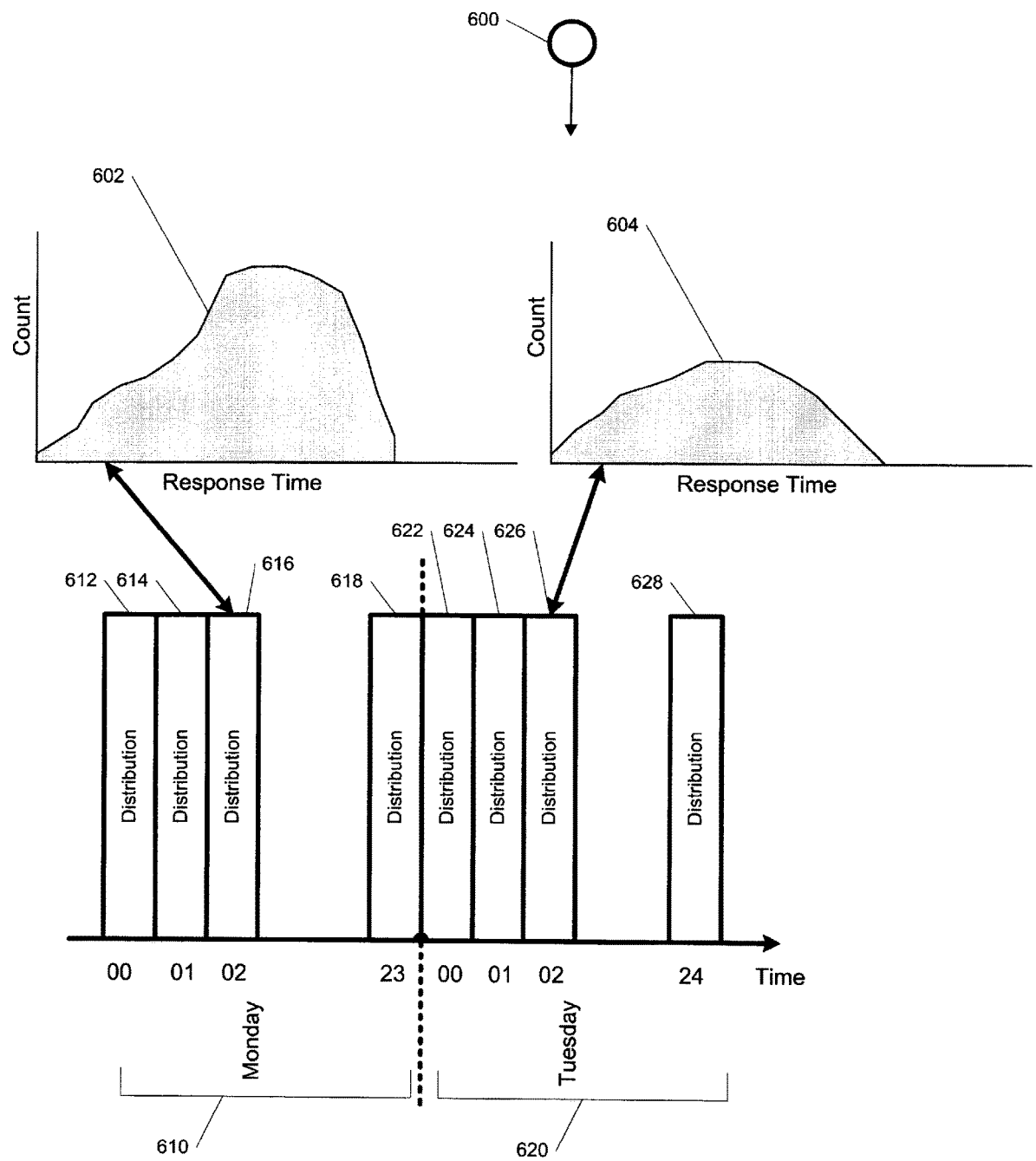
FIG. 6 is a block diagram illustrating a temporal event distribution.

FIG. 6 illustrates by way of example embodiment 600 the Temporal Event Distribution with two days. More than two days are handled in a similar manner. The first day Monday 610 is by way of example broken into hourly distributions. By way of example, block 00 612 contains all events occurring between 00:00 up to an excluding 01:00. Block 01 614 contains all events occurring between 1:00 up to and excluding 2:00, block 02 616 contains all events occurring between 02:00 up to and excluding 03:00, and block 23 618 contains all events occurring between 23:00 up to and excluding 24:00. Similarly, Tuesday 620 is broken into 24 hourly distributions with 622, 624, 626, 628 each corresponding to an hour of the day.

All events for a day are thus divided among hourly blocks, and each block of events comprise a separate distribution. By way of example, the Raw Event Distribution (RED) 602 for block 02 616 on Monday 610 is comprised of all events on Monday falling within the specified time window. Similarly, block 02 626 on Tuesday contains the RED 604 corresponding to the same time interval, but only containing events from Tuesday.

The example Raw Event Distributions 602, 604 thus describe events within the 02:00 through and excluding 03:00 timeframe on Monday and Tuesday respectively.

In an alternate example embodiment the day of week is disregarded and all events are divided into 24 separate hourly blocks. In yet another example embodiment the chosen interval is 10 minutes, and each day therefore contains 144 separate Raw Event distributions.

It is obvious to someone with ordinary skills in the art, that any time window may be used and any combination of one or more time constraints may be used to group the event data without affecting the teachings.

4.3 Spatial Event Distribution (SED)

In a deployment with multiple systems, each system may have its own independent set of distributions. Similarly, events from multiple independent systems may be combined into one distribution describing the total system wide behavior. Similarly, subnets, transports, storage subsystem, and other system-level characteristics may be used to define the spatial filter. Similarly, a subset of hosts, subnets, transports, storage subsystems, or other system-level characteristics may be used to filter and thus define a spatial distribution.

Figure 7:
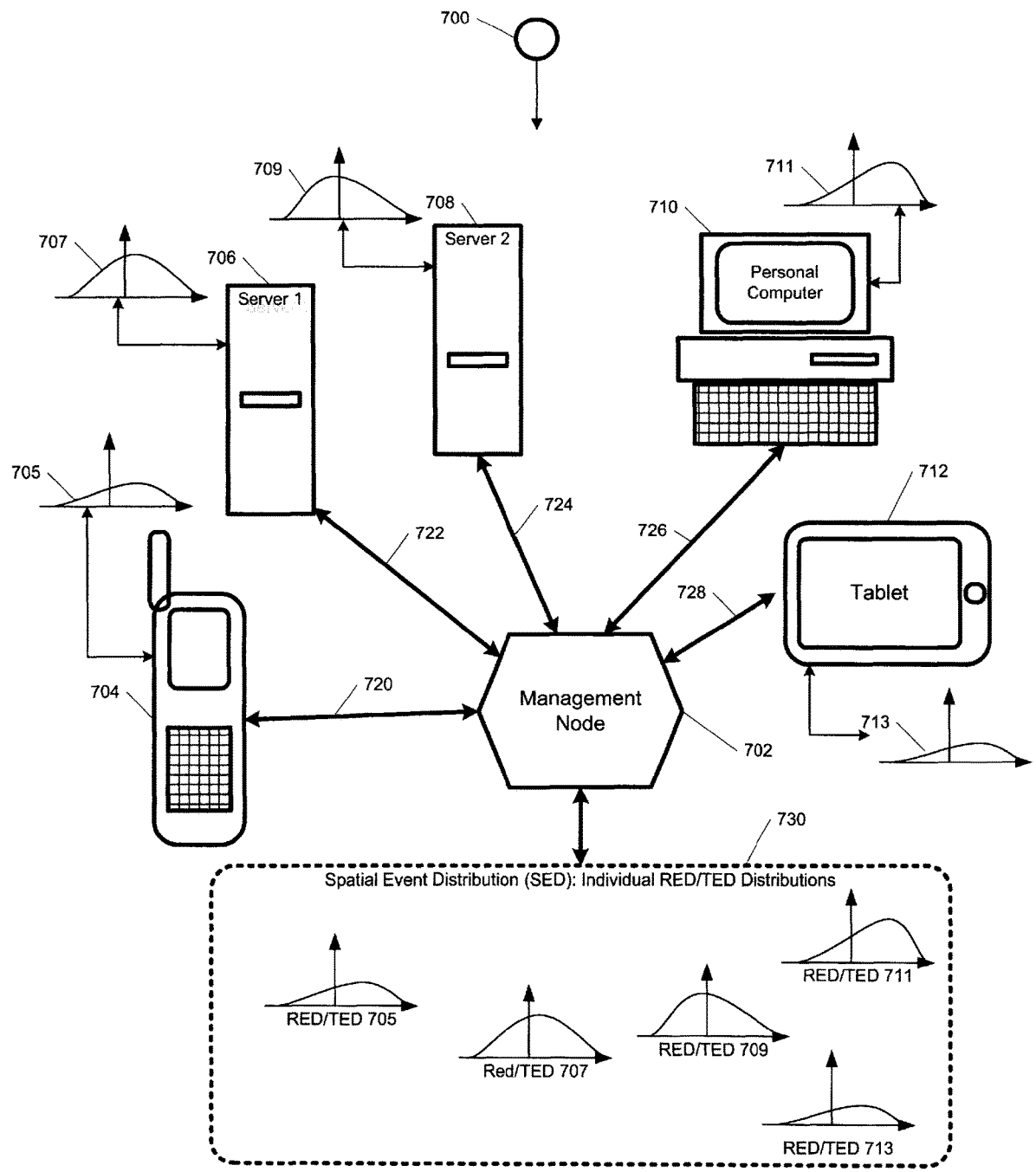
FIG. 7 is a block diagram illustrating a spatial event distribution.

FIG. 7 illustrates by way of example embodiment 700 a management node 702 with five attached devices. A cell phone or PDA 704, two servers 706, 708, a desktop PC 710, and a Tablet 712. Any number of devices is handled in a similar manner.

Each device has associated Raw Event Distributions (REDs), and Temporal Event Distributions (TEDs): The RED/TED Distributions 705 for the cell-phone/PDA 704, the RED/TED distributions 707, 709 for the servers 706,708 respectively, the RED/TED distributions 711 for the PC 710, and the RED/TED distributions 713 for the Tablet 712. Each device 704, 706, 708, 710, 712 may have one or more RED/TED distributions, each measuring one or more characteristics of the system being monitored.

The management node 702 collects all the RED/TED distributions 705, 707, 709, 711,713 from the individual nodes in the system and builds a deployment-wide collection of distributions 730. So where the RED/TED distributions are local to an individual system and do not take other systems directly into account the aggregate Spatial Event Distribution (SED) 730 provides a total system-wide view of all systems or a subset of systems, and may be used to make statistical decisions based on multiple systems and their correlated behavior.

The systems 704, 706, 708, 710, 712 may be co-located in one facility, or at different geographical locations. The teachings above only require that the Management Node can communicate with the individual systems.

Referring to the example embodiment 700, said communication between the management node 702, and the individual systems may be configured with a transport 720 between the management node 702 and the cell phone 704, another transport 722 between the management node 702 and server 1 706, yet another transport 724 between the management node 702 and server 2 708, another transport 726 between the management node 702 and the PC 710, and another transport 728 between the management node 702 and the Tablet 712. The transports may all be the same, all different, or a combination thereof. By way of example, the transport may be TCP/IP over an Ethernet-based network, or the transport may be TCP/IP over a WiFi/802.11 network.

Each system collects and builds its own RED/TED distributions and sends said distributions to the management node for incorporation into the SEDs.

4.4 Event Transformation (ET)

Raw event data from the interceptors may need one or more transformations to make the event data suitable for building the distributions disclosed previously. Other events require no transformation, if the raw event naturally leads itself to building distributions.

Figure 8:
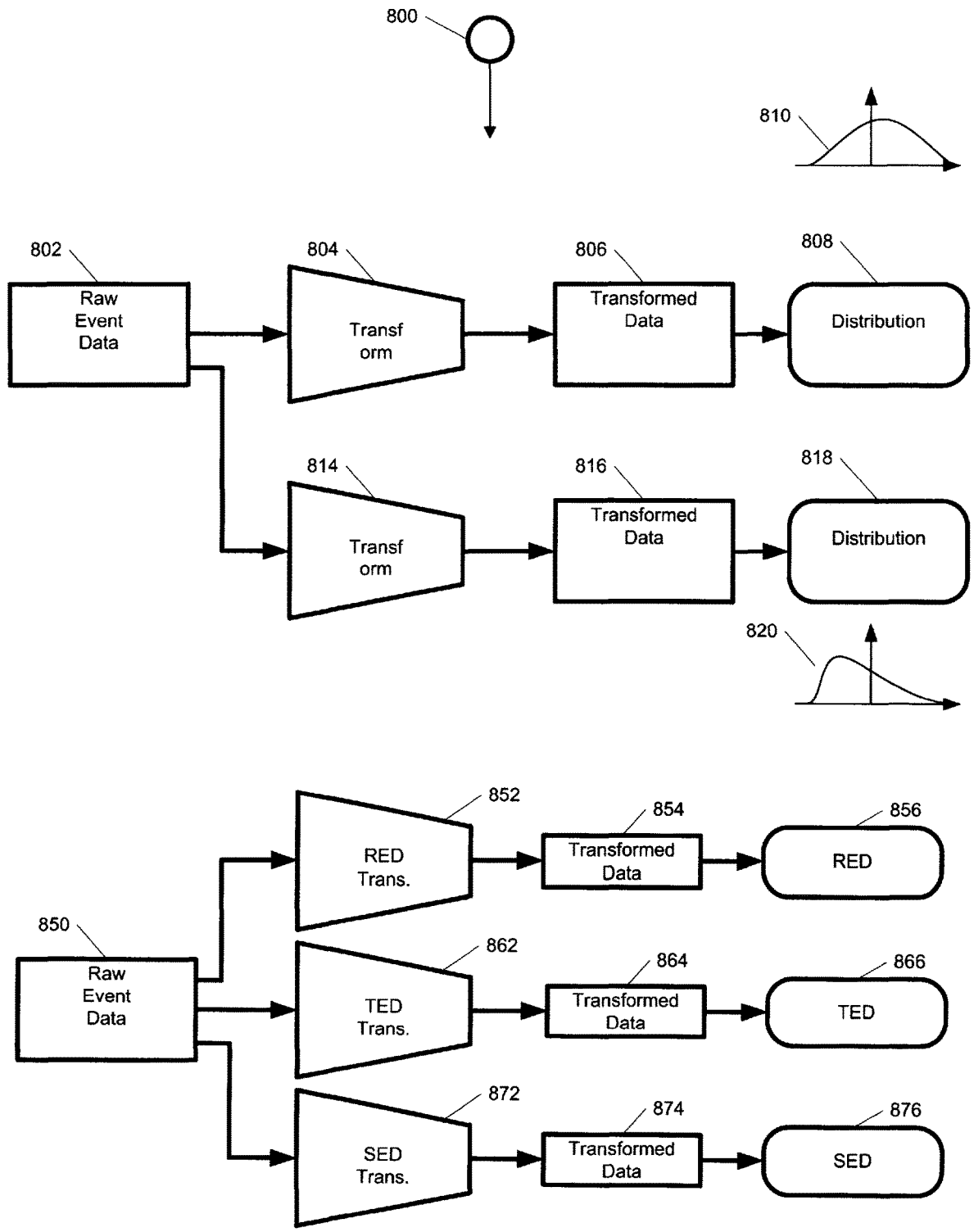
FIG. 8 is a block diagram illustrating the event transformations and generation of multiple events.

FIG. 8 illustrates 800 the transformation of incoming events 802, through the transformation step 804, into transformed data 806. The transformed data 806 serves as the basis for building the above-disclosed distributions 808, 810.

Said transformations may be simple and serve to normalize the event data, or to assign numerical values to event. Transformations may, however, be arbitrary complex and perform any transformation of said event data.

By way of example, a transformation for fwrite( ) may be to calculate the number of bytes written; a transformation for fopen( ) may be to determine the time-of-day for the event in minutes since midnight; and a transformation for a sensor input may be an inverse Hilbert transformation to normalize the data. Another example transformation is the unity-transform, which simply passed the event data straight through without any processing at all. Any transformation is supported by the present application, and the output of said transformation is used to calculate the previously disclosed distributions.

Additionally, a second transform 814 may be used to generate a second set of transformed data 816 with associated distribution 818, 820. Similarly any number of transforms may be provided and any number of distributions created for each event.

By way of example, if the raw event data 802 is the reading of a sensor, transform 1 804 may normalize the data facilitating a distribution 808 describing sensor values over time. Transform 2 814 may be a Fourier transform extracting the spectral components of the event stream, and thus facilitating calculation of the spectrum/distribution 818 of the data stream. The distributions 808, 818 are different and thus provide different ways to measure the same underlying event data.

Transformations may also generate events belonging to different event groups. By way of example, if one event group measure number of bytes written while another event group measures duration of write, one underlying write( ) event may be transformed into one new event for each of said two different event groups.

The present application also supports compound transformations, where the transformation is comprised of multiple transformation performed in series, i.e. one after another. By way of example, and again referring to FIG. 8 for illustrative purposes, Transform 804 may be comprised first of a de-trending transformation, followed by a normalization transformation. De-trending is further disclosed below.

4.4.1 Creation of RED, TED and SED

Event transformations may also be used to create the basic three distributions from any one event. FIG. 8 illustrates by way of example embodiment 800, the creation of the RED 856, TED 866, and SED 876 distributions from one event 850.

The event 850 is copied into three separate instances, and each passed through its own transform. The transform 852 for RED, the transform 862 for TED, and the transform 872 for SED. The transformed data 854, 864, 874 is passed to the individual distributions; RED 856, TED 866, and SED 876 respectively. The transformation subsystem thus provides the infrastructure to generate multiple distributions from one raw data event.

In the preferred embodiment there is one distribution associated with each event. To use all three distributions thus only requires creation of an event for each distribution and the use of the just-disclosed transformation to duplicate the underlying event.

In an alternate embodiment an event may have one or more associated distributions. This essentially combines all distributions for one event or event group into said one event or event group.

4.5 Event and Event Group Hierarchies

As disclosed previously, similar events may be grouped into Event Groups. Event Groups are used to associate related events and to enable broader statistical fault detection.

Figure 9:
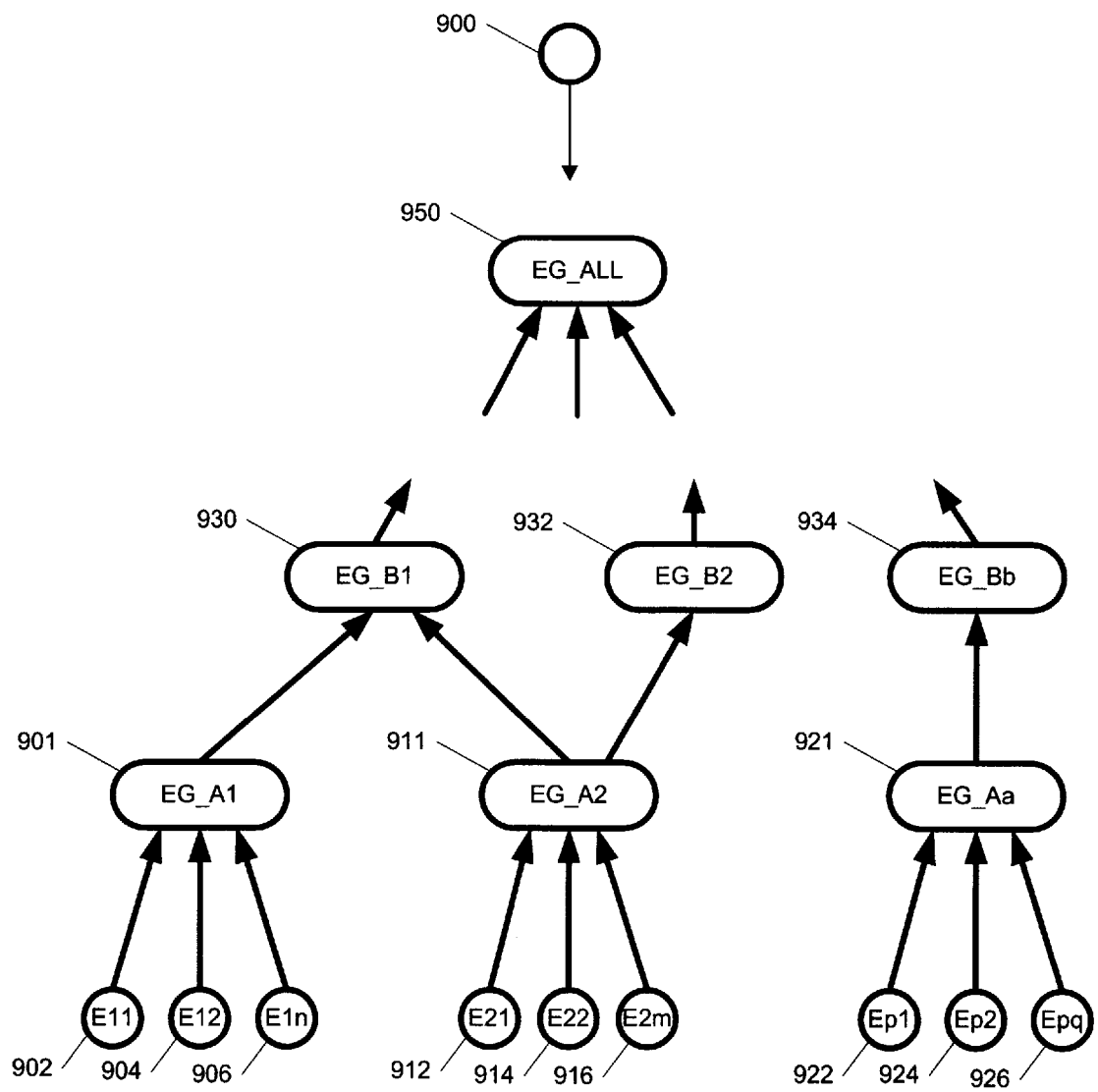
FIG. 9 is a block diagram illustrating event and event group hierarchy.

FIG. 9 illustrates by way of example embodiment 900 an example hierarchy of Events and Event Groups. Events E11 902, E12 904 and E1n 906 are grouped into event group EG_A1 901. Events E21 912, E22 914, and E2m 916 are grouped into event group EG_A2 911. Events Ep1 922, Ep2 924, and Epq 926 are grouped into Event Group EG_Aa 921. In the previous disclosures n, m, p, q, and a represent integers.

Similarly, events in Event Group EGA1 901 and Event Group EG_A2 911 are grouped into event group EG_B1 930. Events in Event Group EG_A2 are grouped by themselves into EG_B2 932, i.e. EG_B2 contains the same events as EG_A2. Finally, Events in Event Group EG_Aa 921 are grouped exclusively into Event Group EG_Bb 934. Event groups may contain some or all of the events of other event groups, or may have no events in common. The ability to include, exclude, or duplicate events one or more times in the hierarchy of event groups provides the flexibility to do statistical fault detection within sub systems, across sub-systems, or across apparently unrelated sub-systems, as the need may be. Ultimately, all events are members of the all-inclusive Event Group EG_ALL 950, which is comprised of all events.

The flexibility of the just-disclosed event hierarchy may be illustrated by way of example. Referring to the example embodiment 900 on FIG. 9, event group EG_A1 901 may correspond to events for file operations that read data, while event group EG_A2 911 may correspond to events for file operations that write data. Event group EG_B1 930 is thus comprised of events for file operations that read or write data, while event group EG_B2 932 is comprised of just events that write data. For applications where data is being generated and written to disk frequently, EG_B2 932 offers fault detection for just write operations, while EG_B 1 offers fault detection for a broader class of both read and write file operations. EG_B2 932 is thus likely a faster fault detector if the storage subsystem has a problem, while EG_B1 930 takes slightly longer to reach statistical significance, but handles a larger set of faults.

Event groups may also be created to separate RED, TED and SED distributions for particular events, or alternatively to group RED, TED and SED distributions for particular events. An event group, by way of example all write( ) methods, may thus be broken further down in to its RED, TED and SED sub groups.

The ability to define a custom hierarchy is thus a powerful way to customize the fault detection capabilities without requiring any specific knowledge about the inner workings of the application being monitored. In the preferred embodiment a hierarchy corresponding to functions in the applications shared libraries is created and event groups assigned to each library. In another preferred embodiment the hierarchy is refined and events are grouped according to their specified functionality (e.g. read, write, create, etc.).

4.6 Event and Event Group Internal Structure

Figure 10:
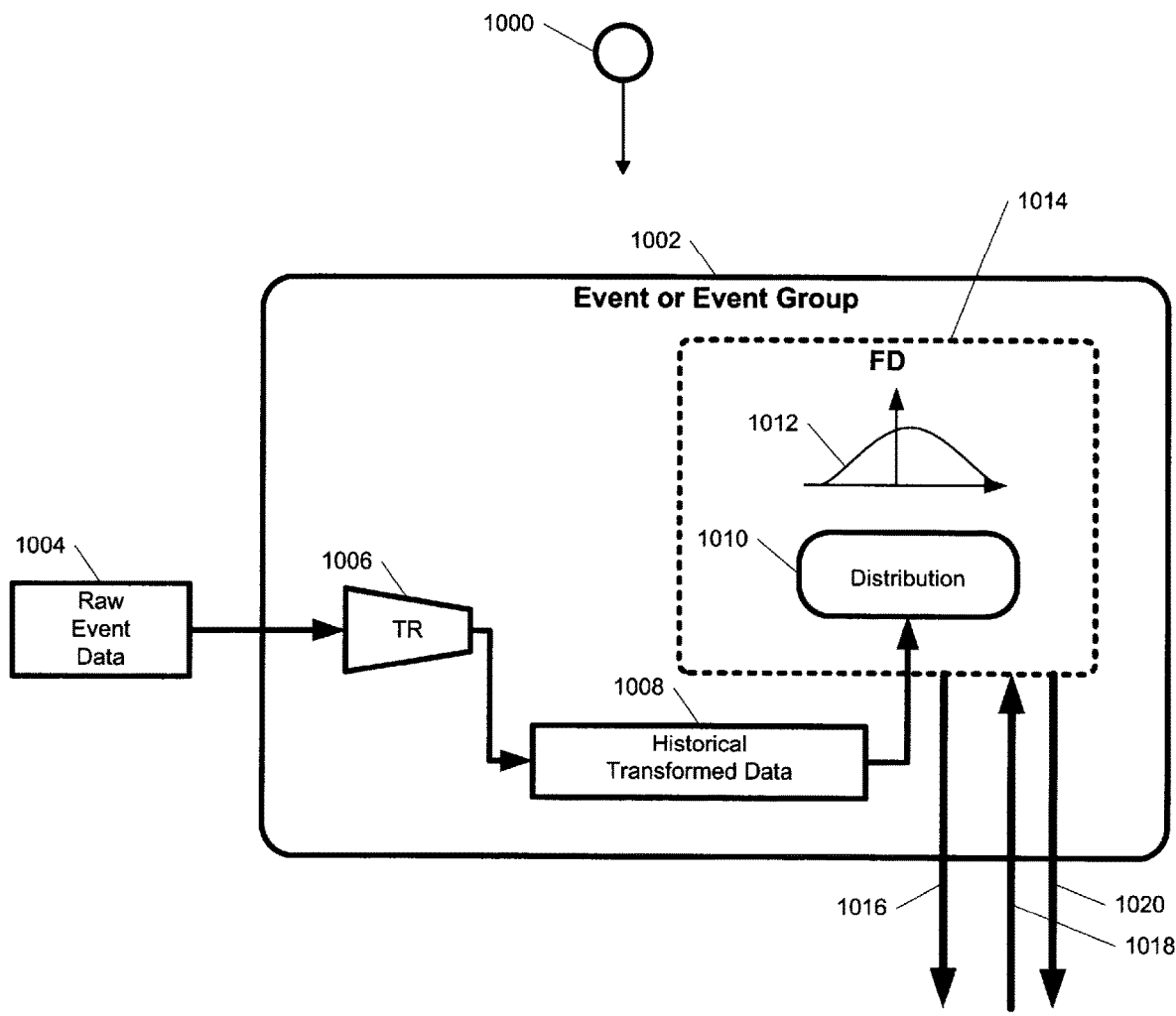
FIG. 10 is a block diagram illustrating fault detection.

FIG. 10 illustrates by way of example embodiment 1000 combined elements of the previous teachings. The internal structures of events and event groups 1002 are similar. Where an event contains one event type and associated distribution an event group contains one or more event types and their associated distribution.

For an event or event group, a raw event 1004 is received and first sent through the transform step 1006. The transformed data is then stored 1008 with other historical transformed data. All distributions require some minimal amount of data in order to be calculated, and historical data for said event or event groups is thus required. The distribution 1010,1012 for said event is then calculated.

The amount of data required for a particular distribution varies depending on the type of distribution and requirements for fault detection time. By way of example, and not limitation, the data included within the historical transformed data 1008 may be the last 1000 events, all the events from the last 24 hours, all events between 8:00 AM and 9:00 AM for the last week, and so on. Depending on distribution and type of fault detection the amount of required data will vary. The historical transformed data 1008 thus contains the data defined by temporal or other rule. By way of example, if the transform requires a specific number of events, the oldest event is removed as new events arrive. By way of example, if the transformed data is all data for the last 24 hours, data older than 24 hours is removed as new data arrives.

As new events arrive 1004 the distribution 1010, 1012 for the event or event group is recalculated. In the alternate embodiment with one or more distributions for each event or event group, all one or more distributions are recalculated.

For each event or event group 1002 Fault Detection 1014 is provided at the level of the individual event or event group. As previously disclosed faults are detected when a sufficient number of events indicate characteristics outside the DV windows as disclosed in section 4.1. Fault Detection 1014 is a capability of the event or event group and is provided in the context of the distribution 1010, 1012 and the chosen measurement of deviation from norm. The fault detection technique applies universally to all distributions, as taught in section 4.1, and is thus identical for REDs, TEDs and SEDs.

Fault Detection may be triggered in multiple different ways: In a preferred embodiment Fault Detection may be triggered after receipt of a new message 1004 and calculation of the distribution 1010, 1012. If the distribution after the new event indicates sufficient deviation from the norm, a fault detection event is generated 1016. The generated fault event 1016 may be stored within the event or event group for later retrieval, or delivered to outside the event or event groups using one of messaging or interrupts.

In an alternate embodiment, the fault detection is polled from 1018 external to the FD 1014, and the result of the fault detection returned 1020.

4.7 Distributions with Trend

By way of example, consider the email system with heavy load previously introduced at the beginning of Section 4.0. Earlier teachings included how to properly handle the fact the email system may be unusually busy Monday mornings as everyone returns from the weekend. In this case a temporal distribution was deployed to handle the case of the additional, but expected, load on Monday mornings.

A similar problem may present itself on a different time scale. If the company is adding staff, it may experience a natural increase in the amount of email traffic entirely based on the growing employee base. If a temporal distribution with a focus on Monday is deployed, there are only 52 Mondays in a year, and it is thus possible that the number employees at any time would be significantly different from the number of employees six or twelve months ago. If the distributions included data for six months (only 26 Mondays) or a year, there could like be significant drift in the internals of the distribution.

Figure 11:
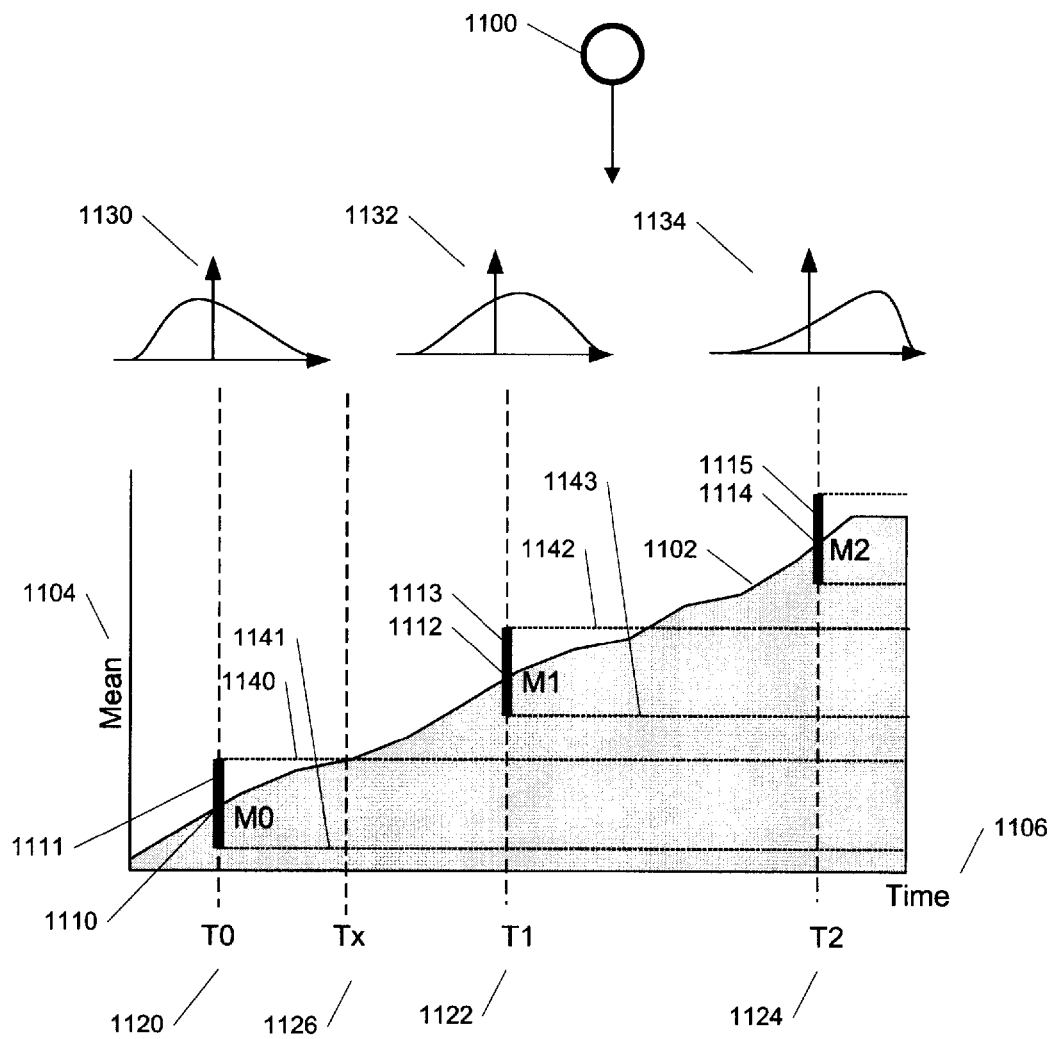
FIG. 11 is a block diagram illustrating trend

FIG. 11 illustrates by way of example embodiment 1100 aspects of the situation in more detail. FIG. 11 illustrates the mean 1104 of a distribution 1102 as it evolves over time 1106. At time T0 1120 the distribution 1130 has mean M0 1110, at time T1 1122 the distribution 1132 has mean M1 1112, and at time T2 1124 the distribution 1134 has mean M2 1114. The Distribution Variability (DV) around the mean is indicated 1111 for T0 1120, 1113 at time T1, and 1115 at time T2.

For the distribution at T0 1120 the upper range of mean+DV is identified by item 1140 and the lower range of mean−DV by 1141. Similarly for T1 1122 the mean+DV is identified by 1142 and mean−DV by 1143.

As illustrated on FIG. 11, at about time Tx 1126 the mean 1102 crosses above the upper range of mean+DV for the distribution at T0 1120, 1130, so if the distribution at T0 1130 were used for fault detection, a fault would be detected erroneously based on the distribution 1130 at time T0 1120.

As taught previously in section 4.6, fault detection is based on the current distribution, so while the present application would use the distribution at Tx 1126 the example above exemplifies how drift may skew the distributions in a very real way.

Figure 12:
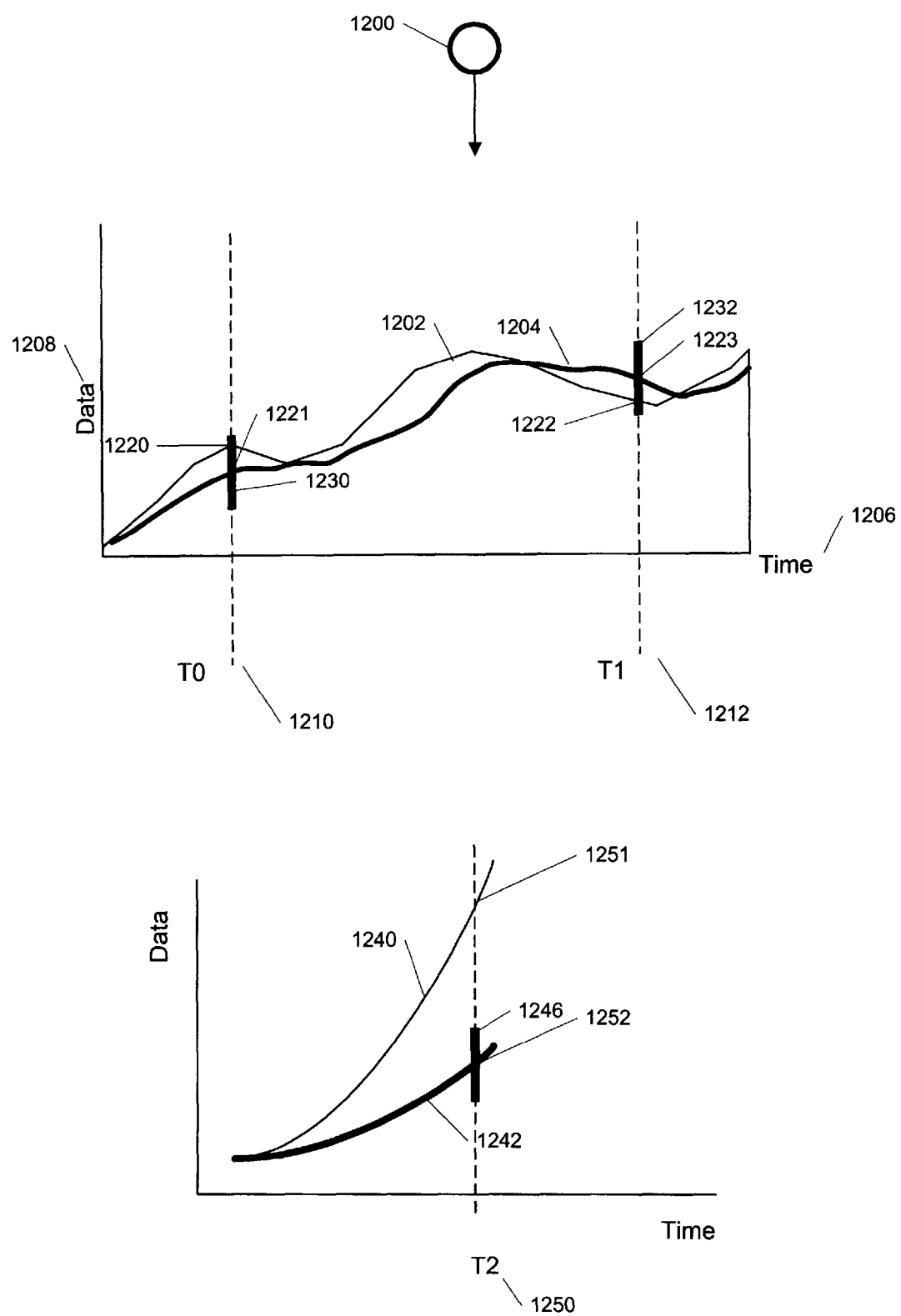
FIG. 12 is a block diagram illustrating trends impact on distribution and fault detection.

FIG. 12 illustrates by way of example embodiment 1200, the trend issues from a different perspective. FIG. 12 illustrates the underlying data 1202, 1208 for of a distribution as it evolves over time 1206, and the mean of the distribution 1204 as it evolves over time. The mean is the average over a specific number of data elements and will thus lag the data. At time T0 1210 the data 1220 is larger than the mean 1221, while at time T1 1212 the data 1222 is less than the mean 1223. The distribution variability (DV) is indicated 1230 at T0 1210 and 1232 at time T1 1212. At T0 1210 the data value 1221 lies within the interval [mean−DV;mean+DV] (mean 1221, DV 1230), and at T1 the data 1222 lies within the interval [mean−DV;mean+DV] (mean 1223, DV 1232).

FIG. 12 also illustrates by way of example embodiment 1200 a scenario where the distribution variability interval does not cover the current data values. For a data series that is growing rapidly 1240 the mean 1242 may lag behind significantly, and the interval mean−DV and mean+DV (mean 1252, DV 1246) at time T2 1250 may not cover the data 1251 at T2 1250. This part of the example embodiment illustrates a scenario where the data series is growing at a rate that the mean-calculation essentially cannot keep up with.

In the context of the present application no fault would be triggered at time T0 1210 as the data was within the variability range, and likewise for T1 1212. T2 would trigger a fault as the current data 1251 falls outside the variability range [mean−DV, mean+DV] (mean 1252, DV 1246).

So while the prior teachings correctly fault-detect in the vast majority of cases, there are situations where the underlying data varies so rapidly that mean and variability calculation may be unable to track fast enough.

4.8 De-Trending the Data.

To adjust for rapid changes in the data, the underlying data is broken into multiple data series: one or more series containing the trend and the remaining core data with trend removed. The process of removing data is called de-trending. Similarly, the process of estimating the trend is called trend-estimation, and the functionality providing trend-estimation is called a trend-estimator.

De-trending is commonly used to remove longer-term trends from data such as seasonal variations, compound growth variations and other forms of changes. The present application uniquely uses de-trending to address both trend that is longer in duration that the mean of the core distribution, and shorter in duration than the core distribution.

Differencing:

One technique for de-trending is differencing and is calculated as follows $$dt(i) = data(i) - data(i-p)$$

where dt(i) is the de-trended data at time 'i', data(i) is the original data at time 'i', and p is a delay. The delay is a delay such as one time period, one day, one week, a specific number of events, or other specified delay. By subtracting an earlier value (i.e. data(i−p)) from the current value (data(i)) any trend between those time points in time is subtracted out. For differencing, the trend-estimator is thus calculated as data(i)−data(i−p).

Moving Averages:

Another technique for de-trending is estimating the trend using a moving average, and then removing the trend estimate from the data:

$$dt(i) = data(i) - movAvg(data, i)$$

where dt(i) is the de-trended data at time 'i', data(i) is the original data at time 'i', and movAvg(data,i) is a moving average of the data at time 'i'. Moving averages is a technique well-known to those with ordinary skills in the art. Example moving averages include, but are not limited to, simple moving average, exponential moving average, weighted moving average, and moving median. Moving averages are thus a type of trend-estimator.

Least Squares:

Yes another technique is to estimate the trend using a least squares linear regression, and removing the linear regression from the data:

$$dt(i) = data(i) - LeastSquaresEst(data, i)$$

where dt(i) is the de-trended data at time 'i', data(i) is the original data at time 'i', and LeastSquaresEst(data,i) is a least squares estimate of the data at time 'i'. Least squares may be calculated using the same parameters as the mean, or using other length. Least Squares is a technique well-known to those with ordinary skills in the art. Least squares is thus another type of trend-estimator.

Trend Estimation:

In general de-trending may be achieved as:

$$dt(i) = data(i) - trend(data, i)$$

where dt(i) is the de-trended data at time 'i', data(i) is the original data at time 'i', and trend(data,i) is an estimate of trend at time 'i'. Estimation of trend is well researched and many approaches have been published. As with previously disclosures related to distribution estimation, many of these techniques make specific assumptions about the underlying distribution. For applications related to fault-detection, the distribution is generally unknown, and efficacy of more sophisticated distribution-specific approaches may be questionable. However, within the context of the present application and along with the teachings above, any estimate of trend may be used, with or without assumption of underlying distribution. Examples of other trend estimation techniques include, but are not limited to Autoregressive Moving Averages (ARMA), Autoregressive Integrated Moving Averages (ARIMA), and general regression analysis. These techniques are well known to someone with ordinary skills in the art and will therefore not be discussed further herein. Another class of trend estimators is built around spectral techniques such as Fourier analysis and Maximum Entropy Spectral Estimation to determine dominant signal components. Further teachings on this class of techniques are provided in section 4.10.

Yet another class of trend estimators is built using digital filters such as Kalman filters, finite impulse response (FIR) filters, and infinite impulse response (IIR) filters. Digital filters are well known to someone with ordinary skills in the art and will therefore only be disclosed as needed to better illustrate their use within the context of the present application. A digital filter is a system that performs a mathematical operation on signal data; which for the present application is event data. The previously introduced moving average may be viewed as a digital filter, as may differencing, least squares, ARIMA and the other previously disclosed trend estimation techniques. A FIR filter is a filter whose impulse response is of finite duration, while an IIR filter is a filter whose impulse response is of infinite duration. Example filters include, but are not limited to, Kalman filter, Chebyshev filter, Elliptic filter, and Butterworth filters. The literature is rich with digital filters meeting a variety of design objectives. As the primary objective digital filters within the context of the instant application is trend estimation, filters that isolate particular aspects of the spectrum or particular aspects of the signal are of most value. For isolation of long-term trend, low-pass filters are appropriate, for isolation of short term trends, high-pass filters are appropriate, and for general removal of noise the output of a high-pass filter may be removed from the original signal. A low-pass filter allows frequencies below a certain frequency to pass through the filter, while it attenuates frequencies above said frequency. Similarly, a high-pass filter allows frequencies above a certain frequency to pass through the filter, while it attenuates frequencies below said frequency. Finally, a band-pass filter allows frequencies within a certain range to pass through the filter, while it attenuates frequencies outside the band. These techniques and concepts are well known to someone with ordinary skills in the art and will not be further disclosed herein.

By way of example, de-trending and trend-estimators may be implemented within a pre-loaded interceptor, within a library, or within a statistical fault detector.

4.8 De-Trending Viewed as a Transformation

De-trending may be viewed as an event transformation, and thus fits naturally into the previous teachings in section 4.4 Event Transformation. Incoming events are transformed using a de-trending technique and the distributions for fault detection are built from the de-trended data.

By way of example, it is thus possible to have one RED distribution based on original event data, and a second RED distribution based on de-trended event data. Depending on the trend-detector (see section 4.9) a different RED distribution may be used.

Referring to FIG. 8 for illustrative purposes, 804 may be comprised of de-trending followed by other transformation, while 814 may be comprised of only the other transformation. Compound transformations are thus inherently supported by the present application.

4.9 Detection of Trend

A trend may be detected in a variety of ways: One approach is to measure the change in data values over the same period used to calculate the mean and determine if the change in data value consistently exceed the mean plus/minus DV. In view of a consistent deviation larger than the mean plus/minus DV a trend may be present.

Another approach is to measure the dominant period of the data, using by way of example Fourier analysis, and determine if the data change over the dominant period consistently exceeds the mean plus/minus DV. In view of a consistent deviation larger than the mean plus/minus DV a trend may be present. The dominant period may be determined in a variety of ways by way of example including Fourier Transformations, Fast Fourier Transformations (FFT), Hilbert Transformations, Filter Banks, or Maximum Entropy Spectral Estimation. Various ways to determine dominant period are further disclosed below in section 4.10.

Another approach is to factor in some fundamental characteristics of the data series: increasing employee base, increasing utilization, decreasing unit cost etc. In view of a consistent deviation larger than the mean plus/minus DV a trend may be present.

To determine if a consistent deviation larger than the mean plus/minus DV is present one or more approaches may be used: over a period of events determine if the majority of the events are outside mean plus/minus DV, determine if a particular fraction, by way of example 75%, are outside mean plus/minus DV, or determine if all of the events are outside mean plus/minus DV.

The terminology trend-detector is used herein to designate the functionality of trend detection. A trend-detector may be provided with an interceptor pre-loaded along with the other pre-loaded functionality. Alternatively, the trend-detector may be provided within the fault-detection interceptor or a library.

4.10 Spectral Techniques and Dominant Frequency

Spectral techniques such as Fourier transformations, Fast Fourier Transformations, Hilbert Transformations, Filter Banks, and Maximum Entropy Spectral Estimation are well known to someone with ordinary skills in the art and will only be described as needed to illustrate the teachings of the present application.

4.10.1 Classic Techniques

By way of example, a Fourier transformation of a signal breaks the signal down into its component frequencies, i.e. the Fourier transformation provides an alternate way to view of the signal from the frequency domain. Fast Fourier transformations and Hilbert Transformations offer alternate ways to calculate essentially a similar frequency domain model of the signal. Likewise, as illustrated below, Filter Banks and Maximum Entropy techniques provide other effective ways to measure select frequency domain aspects of a signal.

The present application builds distributions from statistical events, and these distributions vary over time. In the context of the present application, a stream of events is viewed as a signal, and the spectral techniques are applied to the stream of events in order to isolate dominant frequencies or other trending characteristics. The output of the spectral transformation (by way of example, a Fourier transformation) is called a spectrum for the signal. In the spectral domain a dominant frequency, and its corresponding dominant period, is a peak or other high-amplitude area in the spectrum that represent a significant part of the energy of the total spectrum relative to the surrounding energy or the total energy in the spectrum.

Figure 13:
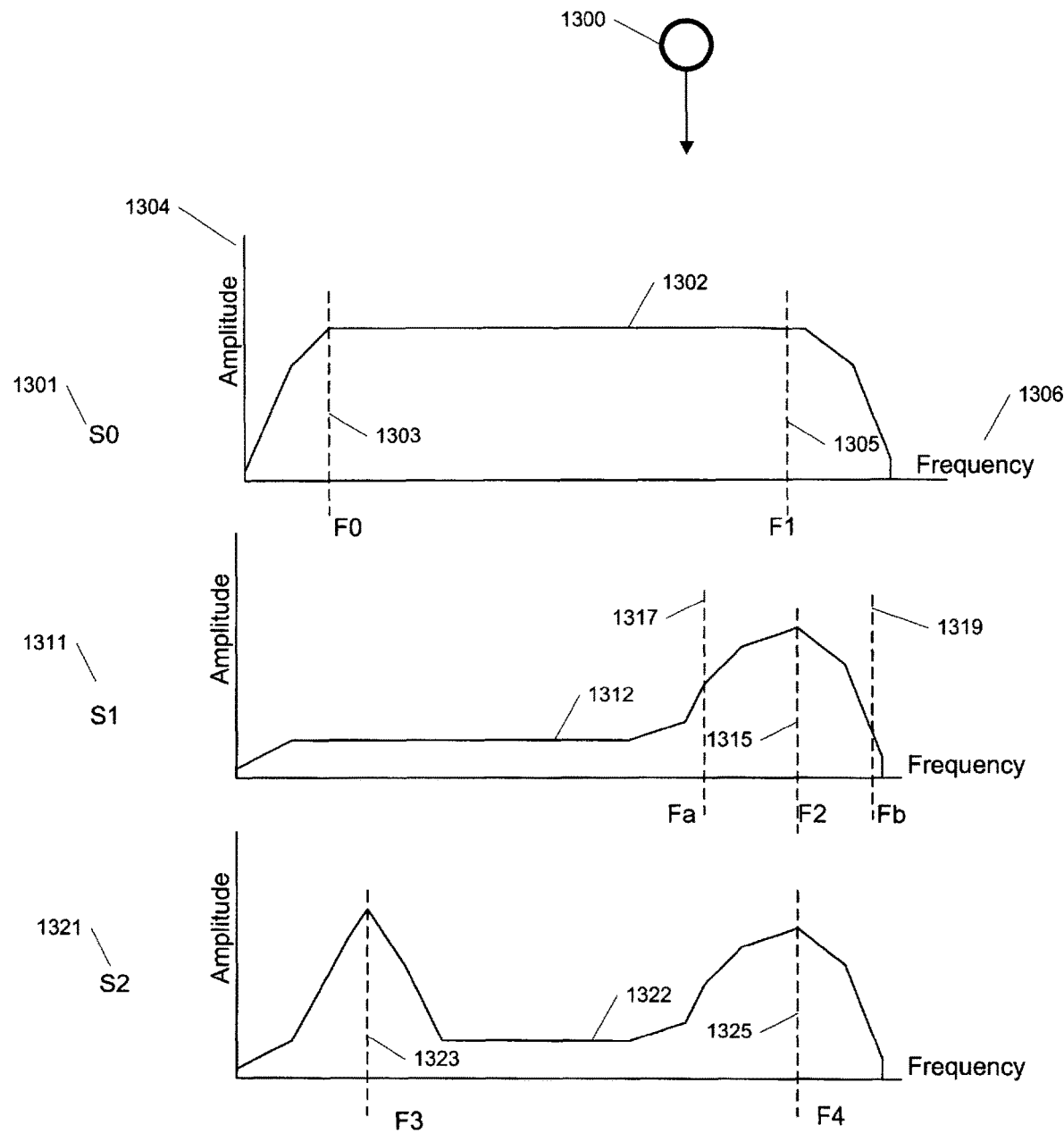
FIG. 13 is a block diagram illustrating various distributions and dominant frequencies

FIG. 13 illustrates by way of example embodiment 1300 various aspects of this in more details. S0 1301 illustrates a spectrum 1302 with frequency 1306 along the horizontal axis and amplitude 1304 along the vertical axis. Similarly, the S1 1311 and S2 1322 illustrate spectra 1312, 1322 for other signals or for the same underlying distribution/signal, but at another time.

S0 1301 illustrates by way of example embodiment a spectrum 1302 where the majority of the frequencies have the same amplitude and are contained within a broad range from F0 1303 to F1 1305. For S0, there is no obvious dominant frequency. In this case, a variety of dominant frequency may be chosen, including but not limited do the mid-point of the range F0 to F1, the "center of gravity" for the spectrum calculated as a weighted average of the spectral contributions with weights equal to the amplitude.

S1 1311 illustrates by way of example embodiment a spectrum 1312 where there is a distinctive peak in the spectrum. In the area around frequency F2 1315 the amplitude is substantially higher than elsewhere in the spectrum. In this case, the dominant frequency may be chosen as one of F2 1315, the center of gravity for the spectrum of the range Fa 1317 through Fb 1319, or other measurement.

S2 1322 illustrates by way of example embodiment a spectrum 1322 with two distinctive peaks. In the areas around F3 1323 there's a peak, and in the area around F4 1325 there is a peak. For S2 there are thus two candidates for dominant frequency, and if a dominant frequency is needed one needs to be chosen based on the circumstance. Each of the two dominant frequencies may be estimated using the techniques disclosed previously for S1 1311. If the dominant frequency is to be used for removal trend caused by rapid change in the event data, the higher frequency for F4 1325 may be used. If the dominant is to be used for removal of long-term trend caused by slower variations, the lower frequency for F3 1325 may be used.

The peaks may be determined in a variety of ways. One such way subdivides the spectrum into bands of equal-sized frequency bands and estimates the relative energy in a band as the amplitude times the width of the band. A peak may be present if one or more bands have substantially higher energy that the surrounding areas. Multiple peaks may be found in a similar way. This approach also works if the frequency bands have different sizes. Another approach is to approximate the spectrum using a low order (e.g. $2^{nd}$ or $3^{rd}$ order) continuous or smooth (continuous and continuous $1^{st}$ derivative) series of polynomials and analytically determine the behavior of the slope ($1^{st}$ derivative) to detect peaks (max) and valleys (min). Alternatively, the polynomials are evaluated and maximum value is found by evaluation the polynomials across the entire spectrum. The alternate technique may require the evaluation to be performed equidistantly across the entire spectrum 4.10.2 Filter Banks Another technique for calculation of dominant frequency is the use of Filter Banks. A filter bank is a series of band-pass filters covering the entire spectrum. A band-pass filter allows frequencies within a certain range to pass through the filter, while it rejects, essentially by attenuating, frequencies outside the band. Band-pass filters are well known to anyone with ordinary skills in the art and will only be described as needed to illustrate the teachings of the present application. A series of band-pass filters may thus be used to break a signal down into a series of frequency ranges, where each range corresponds to a filter. A filter within a filter bank naturally has a center value, which is the mid-point of the band-pass filter.

Figure 14:
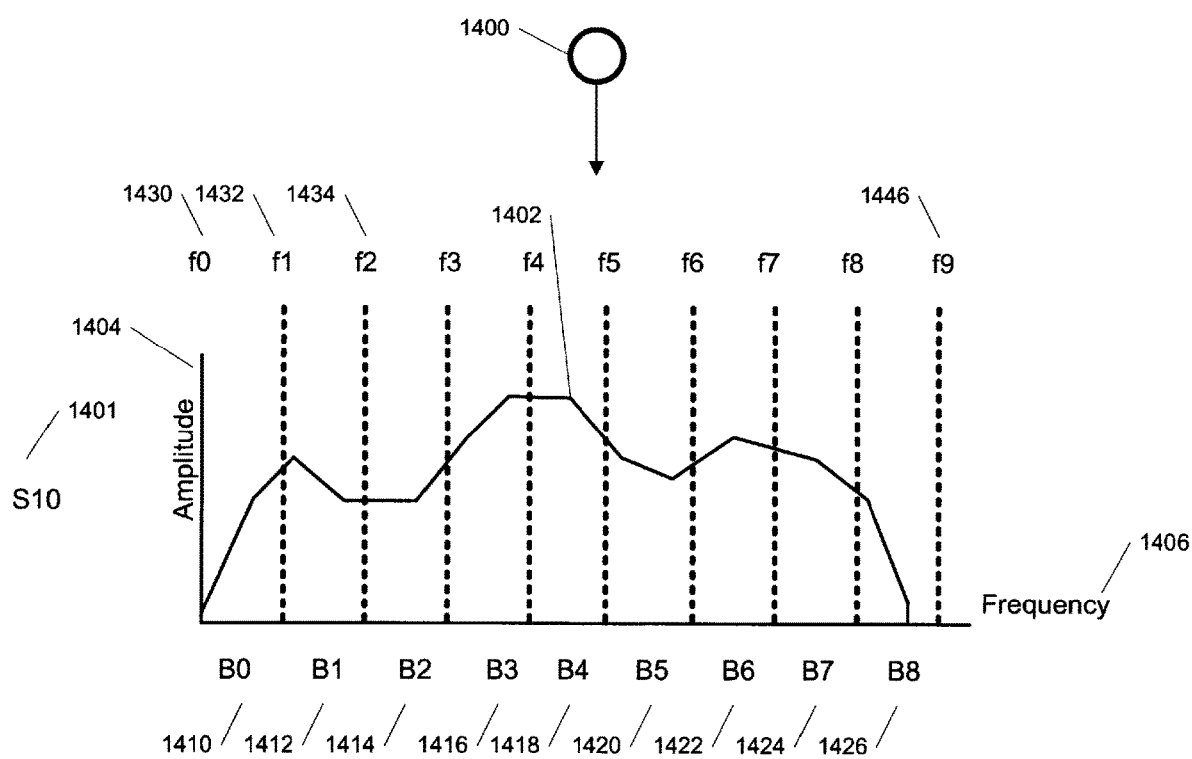
FIG. 14 is a block diagram illustrating a filter bank.

FIG. 14 illustrates by way of example embodiment 1400 the operation of a filter bank within the context of the present application. S10 1401 illustrates a spectrum 1402 with frequency along the horizontal axis 1406 and amplitude along the vertical axis 1404. By way of example, the spectrum 1402 is divided into 9 bands: Band B0 1410, band B1 1412, B2 1414, B3 1416, B4 1418, B5 1420, B6 1422, B7 1424, and band B8 1426. Even though 9 bands are illustrated here, it is obvious to someone with ordinary skills in the art that the following teachings generalize to any number of bands.

Each band corresponds to a specific part of the frequencies, such that band B0 1410 corresponds to the range between frequencies f0 1430 and f1 1432, band B1 1412 corresponds to the range between frequencies f1 1432 and f2 1434, and similarly for the other bands.

A benefit of band pass filters over e.g. the Fourier transform is that the band pass filter may operate directly on the event stream signal, and therefore not require a spectral transformation. Filter banks thus allows for approximation of dominant frequencies by identifying which filter in the filter bank has the filtered signal with highest amplitude. As previously taught, depending on the types of spectrum zero, one or more spectral peaks may be found and the prior teachings apply as it relates to identifying a possibly dominant frequency. However, for filter banks the actual spectral estimation is performed directly on the event stream (time domain) without the need of a spectral transformation.

It is well known to someone with ordinary skills in the art, that the energy of a signal computed in the time-domain is identical to the energy computed in the frequency domain (Parseval's Theorem). The present application utilizes this fact and computes dominant frequencies by calculating signal energy from different filter banks in the time domain and uses said energies to determine dominant frequencies, which essentially is a spectral/frequency-domain characteristic.

Parseval's theorem therefore facilitates easy comparison of the total energies between various filters in the filter bank as follows: each filter bank generates a filtered signal. The energy, for comparison, in the filtered signal may be estimated by adding the squared signal values over a specific number of elements, which essentially approximates an integration operation. The energy estimate may be accurately compared to similarly calculated energies from other filters, and may thus be used to determine dominant frequency as disclosed previously. Alternatively, the energy for purposes of comparison may be estimated by adding the squared signal values over a specific time period, by way of example, over the last 30 minutes. The absolute value of the energy is not relevant, it is only the relatively value of the energy that plays a role in determining the dominant frequency.

4.10.4 Maximum Entropy

Another technique for estimation of a spectrum is Maximum Entropy Spectral Estimation (MESE). MESE is a sophisticated technique where the spectral content is estimated by fitting an autoregressive linear prediction model of a given order to the signal by optimizing the noise/entropy and removing the "maximum noise" from the original signal. A well-known algorithm, called Burgs algorithm after its inventor, makes this process simple and widely available. Burgs algorithm is especially effective at approximating a spectrum with a minimum amount of data, and in general requires less data than a Fourier transformation.

In the context of the present application MESE is used to estimate the spectrum (without requiring e.g. a Fourier transformation), and may be used in combination with the teachings above to estimate dominant frequencies.

4.11 Dynamic Distributions and Estimation of Trend

Calculation of mean and distribution variability (DV) implicitly requires the specification of how many elements to include in the mean and DV, sometimes called a lookback. Section 4.1 teaches how to determine the number of elements in the calculation of mean and DV. Those teachings are now combined with section 4.10 to include models with dynamic calculation of mean and DV, i.e. where the number of elements in mean and DV vary over time.

Figure 15:
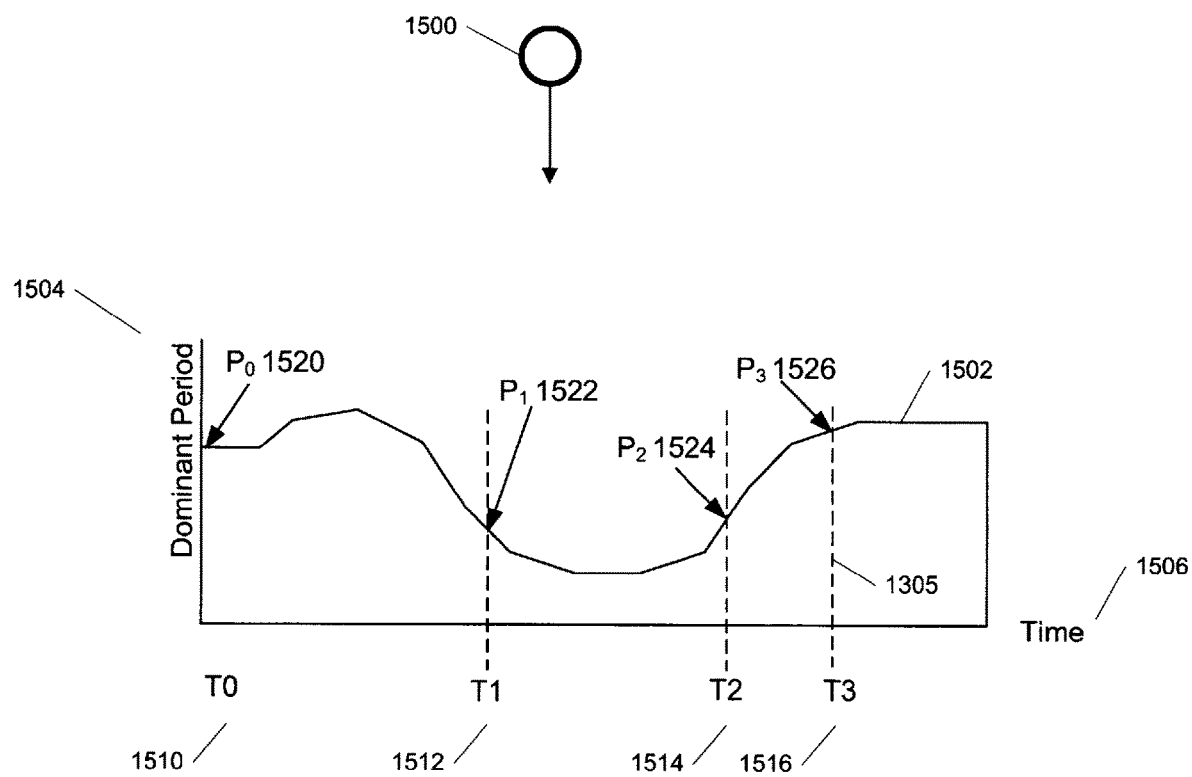
FIG. 15 is a block diagram illustrating a time-varying dominant frequency

FIG. 15 illustrates by way of example embodiment 1500 an event stream with time-varying dominant period 1502 1504. An event stream's dominant period 1502 may be calculated using one or more of the techniques disclosed previously. At time T0 1510 the dominant period is $P_0$ 1520, at time T1 1512 the dominant period is $P_1$ 1522, at time T2 1514 the dominant period is $P_2$ 1524 and at time T3 1516 the dominant period is $P_3$ 1526. In this particular example embodiment the dominant period starts out at $P_0$, increases slightly, falls through $P_1$, bottoms out and starts rising through $P_2$ and finally settles higher near $P_3$.

The Nyquist-Shannon sampling theorem (sometimes just called the sampling theorem) is well-known to someone with ordinary skills in the art, and essentially states that order to resolve a frequency F within a signal through sampling, the signal must be sampled at a frequency of at least 2*F, or twice the desired frequency F. As frequency and period are inverse, Nyquist-Shannon may be applied to the calculation of distributions that adapt to the underlying signal as follows:

In order to measure mean and DV at a particular time several approaches are disclosed:

a) the dominant period is used to calculate mean and DV as it represents one full cycle of activity, b) one half-dominant period is used, as it represents the lowest frequency able to resolve the dominant period per Nyquist-Shannon, or c) a period less than one-half the dominant period To calculate a dynamic distribution and associated mean and DV, the mean and DV are continuously re-calculated for each new event using one of the above-disclosed approaches. The mean and DV thus adapts to new events and naturally changes more or less rapid depending on the actual characteristics of the event stream.

It is important to recognize that Nyquist-Shannon makes certain assumptions regarding the signal, some of which may not be valid for all signals. The above teachings therefore include a variety of ways to calculate the dynamic distributions thereby teachings various way to adapt to real-world environments.

Similarly, the same teachings may be applied to estimating trend as several of the previously disclosed trend estimates are built around the concept of averaging or looking back a certain number of data elements. Said look back or averaging may be dynamically adjusted using the teachings above to achieve dynamic trend estimates.

5 FAULT DETECTION

As disclosed in section 4, fault detection is based on detecting deviation from historical norm using one or more distributions of events. In addition to fault detection at the level of the individual Raw Event Distributions (RED), Temporal Event Distributions (TED), and Spatial Event Distributions (SED), a hierarchy of RED/TED/SED distributions may additionally be used to detect groups of faults, and to correlate fault behavior across events and lower-level event groups. In this context the term "level" means the level of the event hierarchy, and "lower-level" event groups means events or event groups at a lower level within the event and event group hierarchy.

By way of example deviation from the norm may be established when a sufficient number of events indicate characteristics outside the DV windows as disclosed in section 4.1. Section 4.1 also disclosed an example method to determine if there are a sufficient number of events. Sections 4.6 through 4.9 taught how to adapt the distributions to the presence of trend.

Similar teachings apply to TEDs and SEDs. A series of events are thus deemed to indicate a fault if a they in aggregate fall outside the DV window in sufficient numbers.

5.1 Traversal of Fault Detector Hierarchy

The Event Group Hierarchy disclosed above and illustrated on FIGS. 4 and 9 also serves as the underlying structure for fault detection. Each event and event group is comprised of event data and one or more distributions. As disclosed in Section 4.6 an event or an Event Group also contains its own fault detector.

FIG. 9 illustrates by way of example embodiment 900 traversal of the hierarchy of events, event groups and their fault detectors. First the individual events E11 902, E12 904, E1n 906, through Epq 926 are queried. If one of the FDs within said events indicates a fault, Fault Detection is triggered corresponding to said event fault. If no faults are indicated, the first layer of event groups EG_A1 901 through EG_Aa 921 is queried. If one of the FDs within said event groups indicates a fault, Fault Detection is triggered corresponding to said event fault. The same teachings apply to all layers, ending with fault detection in the all-inclusive event group comprised of all events EG_ALL.

The events are considered to be the lowest level of the hierarchy while the all-inclusive event group is considered to be at the highest level of the event hierarchy.

If no faults are detected in any of the events of event groups, the system is deemed to operate without faults. If one or more fault detectors indicate a fault, a fault is deemed to have happened. By traversing the entire hierarchy even if a fault is detected, cascading faults may be handled as disclosed below.

Traversal of the hierarchy bottom to top means that very specific fault detectors are tested first, followed by increasingly more generic fault detectors. By way of example, an event for a write( ) function may indicate significantly longer average write times than normal and thus trigger fault detection at the event level. Alternatively, before any individual write( ) function reaches statistical significance in its fault detection, an event group comprised of all write( ) functions may indicate statistically significant deviation from the norm. An event group with all write( ) functions would thus indicate a fault condition even though no individual write( ) operation has seen enough faults to reach statistical significance. Similarly, if the event group comprised of all write( ) operations doesn't indicate a fault, a larger event group comprised of all file operations may indicate statistically significant deviation from the norm. By traversing the event and event group hierarchy from bottom towards the top, fault detection starts out as specialized as possible and gets increasingly more generic as the hierarchy is traversed.

The fault detection hierarchy as disclosed thus balances rapid fault detection at the individual fault level with the need for broader statistical fault detections across a wide range of functionality.

5.2 Cascading Faults

Faults often cascade through a system, i.e. it's rare that just one fault occurs in isolation.

FIG. 9 illustrates this by way of example embodiment 900. If, by way of example, a storage subsystem has stopped operating, all files operations will fail and quickly generate faults. If events E11 902, E12 904 and E1$n$ 906 are events related to write( ) operations, and events E21 912, E22 914 and E2$m$ 916 are events related to read( ) operations, all said events would likely indicated faults rapidly. So would EG_A1 901 which represents all events with write( ) operations, and EG_A2 911 which indicate all events with read( ) operations. Finally, EG_B1 930, which may all events with file operations, would likely also indicate faults.

The fault in the storage system thus generates cascading faults starting at the event level all the way up through higher levels. Instead of generating all said fault detections, the present application suppresses fault detection events corresponding to cascading faults. This is accomplished as follows:

As the event group hierarchy is traversed from the event level through higher-level event groups, it may be determined if a particular event group indicating a fault has the majority of lower-level events or event groups also indicating faults. In that case, the fault detection of said lower level events or event groups may be suppressed and only the fault corresponding to the higher-level event generated. The same test is applied at all levels of the event group hierarchy and only the highest-level event generates a fault detection.

5.3 Consensus Faults

At times the opposite situation to cascading faults occurs. The individual events do not indicate faults with statistical significance, but a higher-level event groups does. In continuation of the example embodiment 900 disclosed in section 5.2: If the storage subsystem only has intermittent errors the individual write( ) and read ( ) fault detectors may not trigger with statistical significance. However, in aggregate, the event groups EG_A1 901 for write( ) or the event group EG_A2 911 for read( ) may reach statistical significance based on receiving fault events from numerous individual event fault detectors. In this case, the high-level event group has reached consensus fault detection even if no individual events indicate a fault with statistical significance.

5.4 Fault Detection for Cloud Computing

Modern data centers may use a "cloud computing" architecture, also called a "distributed computing" architecture, for its deployment. In said cloud-computing deployment the hosted services are provided using a collection of services running on one or more servers. Often, the services are hosted in remote data centers and accessed over the internet (a.k.a "the cloud"). The present application supports statistical fault detection in such cloud deployment using the teachings above.

FIG. 7 illustrates by way of example embodiment 700 a deployment that may be a cloud deployment. Server 1 706 may be located in one data center, while server 2 708 may be located in the same or another data center. Similarly, the PC 710 may be located in an office, the cell phone/PDA 704 and Tablet 712 are roaming and not generally located in any one place. The management node 702 communicates over the network with said Servers 706, 708, PC 710, cell phone/PDF 704, and a Tablet 712. The respective network connections 722, 724, 726, 720, 728 may be Local Area Networks (LAN), Wide Area Networks (WAN), wireless networks (WN) 802.11 or mobile broadband, or the internet. The present application does not distinguish between where devices are located, and only requires that devices be able to communicate with the management node 702.

The management node, as previously disclosed, aggregates all distributions 730, and may use said RED/TED/SED distributions 730, to make fault detections on devices running in the cloud.

6.0 CONCURRENT FAULT DETECTION

In large systems or cloud deployments with systems running at multiple sites concurrent fault detection across subsystems or systems may improve fault detection time. Within the disclosures the terminology "concurrent fault detection" designates that one or more systems or sub systems are running fault detection in parallel, i.e. simultaneously. By way of example referring to FIG. 7, fault detection may run both on the server 1 706 and tablet 712 simultaneously. By way of example referring to FIG. 9, Fault detection for events Ep1 922 through Epq 926 may run simultaneously to fault detection in E11 902 through E1$n$ 906.

As disclosed in Section 4.6 and illustrated on FIG. 10 a preferred embodiment calculates the fault detection upon receiving new events. Referring to said preferred embodiment, fault detection is thus concurrent across all events, and only the aggregation of faults for consensus and cascading fault detection is performed synchronously by traversing the event hierarchy, In Cloud deployments concurrent fault detection provides decoupling of local fault detection, i.e. RED/TED fault detection, from the centralized SED fault detection and is the preferred embodiment. For local RED/TED fault detection the preferred embodiments supports both models as disclosed previously.

7. DEPLOYMENT SCENARIOS

FIG. 7 illustrates by way of example embodiment 700 a variety of ways the application can be configured to operate.

In one embodiment, the application is configured with a cell phone/PDA 704, two file server 706, 708, a personal computer 710, a tablet 712, and a central management node 720. Communication between the management node 720 and the devices are over transports 720, 722, 724, 726, and 728 respectively. Distributions calculated on each device, 705, 707, 709, 711, 713 are communicated to said management node 720 to collect and aggregate 730 distributions across all devices.

In another embodiment, the application is configured for just wireless devices such as cell phones 704 and tablets 712 and their respective transports 720, 728. In yet another embodiment, the application is configured for just wired devices, 706, 708, 710 and their respective transports 722, 724, 726.

In one embodiment the cell phone transport 720 and tablet transport 728 is local wireless, such as WiFi, while in another embodiment said transport is broadband wireless. In yet another embodiment a combination of WiFi and broadband wireless is used.

In another embodiment a combination of wired, WiFi and broadband wireless transports are used.

Finally, as the interceptors are implemented outside the application, the operating system and system libraries, the present application provides application-agnostic fault detection without requiring any modifications to the application, operating system and system libraries.

The just illustrated example embodiments should not be construed as limiting the scope of the application but as merely providing illustrations of some of the exemplary embodiments of this application

8. CONCLUSION

In the embodiments described herein, an example programming environment, systems and configurations were disclosed for which one or more embodiments according to the application were taught. It should be appreciated that the present application can be implemented by one of ordinary skill in the art using different program organizations and structures, different data structures, different configurations, different systems, and of course any desired naming conventions without departing from the teachings herein. In addition, the application can be ported, or otherwise configured for, use across a wide-range of operating system environments.

Although the description above contains many details, these should not be construed as limiting the scope of the application but as merely providing illustrations of some of the exemplary embodiments of this application. Therefore, it will be appreciated that the scope of the present application fully encompasses other embodiments which may become obvious to those skilled in the art, and that the scope of the present application is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present application, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system, comprising:
    one or more memory locations configured to store one or more applications and one or more distributions, wherein each of said one or more applications is comprised of one or more processes and threads;
    one or more Central Processing Units operatively connected to said one or more memory locations, configured to execute said one or more applications on a host with a host operating system, configured to generate one or more statistical events for said one or more executing applications and said host operating system, and configured to calculate said one or more distributions for said one or more statistical events;
    one or more second memory locations configured to store one or more trend-estimators configured to estimate trends in said statistical events using one or more of a dominant period, a fixed number of events or a dynamic number of events, configured to calculate de-trended statistical event data, and configured to detect trends in the statistical events, wherein said one or more trend-estimators estimate trend using one or more of differencing, a moving average, and a least squares estimate and said trend-estimators are calculated using one or more of a number of elements equal to the dominant period, a period of one-half the dominant period, or a period less than one-half the dominant period; and
    a fault detector configured to de-trend the data for said one or more statistical events prior to calculation of said one or more distributions if said one or more trend-estimator indicate trend.

2. The system according to claim 1, wherein said operating system is one of Linux, UNIX, Solaris, HP/UX, Android, iOS, MacOS, or Microsoft Windows.

3. The system according to claim 1, wherein said one or more distributions are calculated using a number of data elements that is one of the dominant period, one-half the dominant period, and a period less than one-half the dominant period.

4. The system according to claim 3, wherein said moving average is one of simple moving average, exponential moving average, weighted moving average, and moving median.

5. The system according to claim 1, wherein said one or more trend-estimators use one of the same number of data elements or a different number of data elements.

6. A system, comprising:
    one or more memory locations configured to store one or more applications and one or more distributions, wherein each of said one or more applications is comprised of one or more processes and threads;

one or more Central Processing Units operatively connected to said one or more memory locations, configured to execute said one or more applications on a host with a host operating system, configured to generate one or more statistical events for said one or more executing applications and said host operating system, and configured to calculate said one or more distributions for said one or more statistical events;

one or more second memory locations configured to store one or more trend-estimators configured to estimate trends in said statistical events using one or more of a dominant period, a fixed number of events or a dynamic number of events, configured to calculate de-trended statistical event data, and configured to detect trends in the statistical events, wherein said dominant period is estimated using one or more of Fourier Transformation, Fast Fourier Transformation, Hilbert Transformation, filter bank, division of spectrum into frequency bands, or Maximum Entropy Spectral Estimation (MESE); and a fault detector configured to de-trend the data for said one or more statistical events prior to calculation of said one or more distributions if said one or more trend-estimator indicate trend.

7. The system according to claim 6, further comprising a trend-estimator configured to estimate a dominant frequency by division of the spectrum into equal sized frequency bands, configured to determine the frequency band with the highest amplitude, and configured to estimate the dominant frequency to be the center of said frequency band with the highest amplitude.

8. The system according to claim 6, further comprising:
a trend-estimator configured to estimate a dominant frequency by the division of the spectrum into a number of frequency bands, configured to estimate the energy at the center of each band as the size of said band times the amplitude at said center frequency, configured to determine the frequency band with the highest energy, and configured to estimate the dominant frequency to be the center of said frequency band with the highest energy.

9. The system according to claim 6, further comprising a trend-estimator configured to estimate a dominant frequency by the approximation of the spectrum by a continuous or continuous and smooth series of polynomials and configured to calculate the amplitude of said series of polynomials equidistantly across the entire spectrum, and configured to estimate the dominant frequency to be a frequency corresponding to the highest amplitude in said equidistantly calculated polynomials.

10. The system according to claim 6, wherein said one or more trend-estimators use one of the same number of data elements or a different number of data elements.

11. The system according to claim 6, wherein said filter bank is comprised of one or more band-pass filters.

12. The system according to claim 6, further comprising a trend-estimator configured to estimate a dominant frequency by the calculation of the energy in each filter-bank, and configured to estimate the dominant frequency to be the mid-point frequency of the filter bank with the highest energy.

13. The system according to claim 12, wherein the energy in each filter-bank is estimated to be the sum of the squared filtered event data over a number of filtered event data values.

14. The system according to claim 12, wherein the energy in each filter-bank is estimated to be the sum of the squared filtered event data over filtered event data values for a period of time.

15. The system according to claim 6, wherein said trend-estimators use a number of data elements that is proportional to the dominant period.

16. The system according to claim 6, wherein said Maximum Entropy Spectral Estimate is calculated using Burgs algorithm.

17. The system according to claim 6, further comprising a trend-estimator configured to estimate a dominant frequency by division of the Maximum Entropy Spectral Estimate spectrum into even sized frequency bands, configured to determine the frequency band with the highest amplitude, and configured to estimate the dominant frequency to be the center of said frequency band with the highest amplitude.

18. The system according to claim 6, further comprising a trend-estimator configured to estimate a dominant frequency by the division of the Maximum Entropy Spectral Estimate spectrum into a number of frequency bands, configured to estimate the energy at the center of each band as the size of said band times the amplitude at said center frequency, configured to determine the frequency band with the highest energy, and configured to estimate the dominant frequency to be the center of said frequency band with the highest energy.

19. The system according to claim 6, further comprising the one or more trend-estimators using one of a period of one-half the dominant period, and a period less than one-half the dominant period to estimate trend.

20. The system according to claim 6, wherein said one or more distributions are calculated using a number of data elements that is one of the dominant period, one-half the dominant period, and a period less than one-half the dominant period.

* * * * *